(12) United States Patent
Chen et al.

(10) Patent No.: US 10,904,755 B2
(45) Date of Patent: Jan. 26, 2021

(54) DATA DISTRIBUTION FROM A MOVABLE OBJECT

(71) Applicant: SZ DJI TECHNOLOGY CO., LTD., Guangdong (CN)

(72) Inventors: Chaobin Chen, Guangdong (CN); Qiming Liu, Guangdong (CN)

(73) Assignee: SZ DJI TECHNOLOGY CO., LTD., Guangdong (CN)

( * ) Notice: Subject to any disclaimer, the term of this patent is extended or adjusted under 35 U.S.C. 154(b) by 207 days.

(21) Appl. No.: 16/307,115

(22) PCT Filed: Jun. 14, 2016

(86) PCT No.: PCT/CN2016/085764
§ 371 (c)(1),
(2) Date: Dec. 4, 2018

(87) PCT Pub. No.: WO2017/214863
PCT Pub. Date: Dec. 21, 2017

(65) Prior Publication Data
US 2019/0230083 A1    Jul. 25, 2019

(51) Int. Cl.
*H04W 12/06* (2009.01)
*H04W 12/08* (2009.01)
(Continued)

(52) U.S. Cl.
CPC .......... *H04W 12/06* (2013.01); *G06F 16/219* (2019.01); *G06F 16/24553* (2019.01);
(Continued)

(58) Field of Classification Search
CPC ..... H04W 12/06; H04W 12/08; G06F 16/219; G06F 16/24553; G06F 8/71; H04L 63/10; H04L 63/101; H04L 63/0884; H04L 63/20
See application file for complete search history.

(56) References Cited

U.S. PATENT DOCUMENTS 6,377,875 B1 *  4/2002  Schwaerzler ......... B64C 39/024
                                                244/1 R
6,856,894 B1 *  2/2005  Bodin .................. G05D 1/0044
                                                244/75.1
(Continued)

FOREIGN PATENT DOCUMENTS

CN    105388907 A    3/2016
CN    105549463 A    5/2016
(Continued)

OTHER PUBLICATIONS

International Search Report and Written Opinion for Application No. PCT/CN2016/085764, dated Mar. 1, 2017, 7 pages.

*Primary Examiner* — Cheng-Feng Huang
(74) *Attorney, Agent, or Firm* — Nicholson De Vos Webster & Elliott LLP

(57) ABSTRACT

Described herein are systems, methods, storage media, and computer programs that support data distribution in a movable object environment. In one embodiment, a request for characteristic data of a movable object is received from a requester of an affiliated device; it is confirmed that the characteristic data is available and that the requester has a privilege to access the characteristic data; and the characteristic data is provided to the affiliated device. In another embodiment, a request for the characteristic data, via a communication adaptor, from the requester, where the request for characteristic data includes information indicative of whether the affiliated device having a privilege to access the characteristic data; the characteristic data from the movable object is received, via the communication adaptor, responsive to the request for the characteristic data; and the characteristic data is provided, via the communication adaptor, to the requester of the affiliated device.

17 Claims, 26 Drawing Sheets

(51) Int. Cl.
*G06F 16/21* (2019.01)
*G06F 16/2455* (2019.01)
*H04L 29/06* (2006.01)
*G06F 8/71* (2018.01)

(52) U.S. Cl.
CPC ............ *H04L 63/10* (2013.01); *H04W 12/08* (2013.01); *G06F 8/71* (2013.01); *H04L 63/0884* (2013.01); *H04L 63/101* (2013.01); *H04L 63/20* (2013.01)

(56) References Cited

U.S. PATENT DOCUMENTS

| | | | | |
|---|---|---|---|---|
| 8,903,568 B1* | 12/2014 | Wang | .................... | B64D 47/08 701/2 |
| 9,757,002 B2* | 9/2017 | Thompson | .............. | A47F 13/00 |
| 2004/0098454 A1 | 5/2004 | Trapp et al. | | |
| 2005/0006525 A1* | 1/2005 | Byers | .................... | B64C 1/061 244/118.1 |
| 2007/0284474 A1* | 12/2007 | Olson | .................. | G05D 1/0022 244/10 |
| 2010/0250022 A1* | 9/2010 | Hines | .................. | G05D 1/0094 701/2 |
| 2011/0123028 A1* | 5/2011 | Karabinis | ............ | H04B 1/7097 380/270 |
| 2014/0032034 A1* | 1/2014 | Raptopoulos | ........ | G05D 1/0088 701/25 |
| 2014/0263823 A1* | 9/2014 | Wang | .................... | A63H 27/12 244/17.23 |
| 2014/0373124 A1* | 12/2014 | Rubin | .................. | H04W 72/10 726/7 |
| 2014/0380425 A1* | 12/2014 | Lockett | ................... | H04L 63/20 726/4 |

FOREIGN PATENT DOCUMENTS

| | | |
|---|---|---|
| CN | 205229810 U | 5/2016 |
| CN | 105636042 A | 6/2016 |

* cited by examiner

Movable Object Database 1400
(e.g., Version 12.1.00)

| Data Identifiers 1402 | Data Versions 1404 | Values 1406 |
|---|---|---|
| Velocity (Meter per second) 1410 | 11.4.00 | 2 |
| Position (GPS coordinate) 1412 | 12.1.00 | N 38 45.123 W 108 25.123 |
| Altitude (Meters) 1414 | 11.1.00 | 200 |
| Period in Motion (Minutes) 1416 | 12.1.00 | 10 |
| ⋮ | ⋮ | ⋮ |

FIG. 14

| Communication Parameters 2202 | Range of Values 2204 | Default Values 2206 |
|---|---|---|
| Connection bandwidth in KB/s 2210 | 5-20 | 5 |
| Packet buffer size in Bytes 2212 (e.g., cmd_buf) | 5-100 | 5 |
| Packet acknowledgment timeout period in ms 2214 (e.g., ack_timeout) | 100-500 | 500 |
| Retry limit 2216 (e.g., retry_time) | 3-6 | 3 |
| ⋮ | ⋮ | ⋮ |

FIG. 22

DATA DISTRIBUTION FROM A MOVABLE OBJECT

CROSS-REFERENCE TO RELATED APPLICATIONS

This application is a National stage of International Application No. PCT/CN2016/085764, filed Jun. 14, 2016, which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The disclosed embodiments relate generally to software application development and more particularly, but not exclusively, to application development for using movable objects.

BACKGROUND

Unmanned aircrafts, as well as other movable objects, such as the unmanned vehicles and robots, have seen rapid adoption in a wide range of fields. Movable objects are used in aerial photography/video, parcel delivery, agriculture, rescue mission, and space exploration, and people are constantly finding new ways to utilize movable objects as the movable objects often provide gateways to new industries and also offer unique perspective for advancing traditional industries.

Traditionally a vendor of a movable object provides end-to-end solutions, and the vendor provides both hardware and software in a predetermined field. However, as movable objects move out of the realm largely occupied by hobbyists and move into mainstream commerce, proprietary solutions are no longer suitable. A closed movable object environment, where the vendor of a movable object offers little information to an independent application developer, hinders the adoption of the movable object in various fields where the vendor has less insight or less resources than that of the application developer. Yet, the vendor of a movable object should retain a level of control in managing the movable object to prevent malicious attack to the movable object.

It is beneficial to provide enough information to make communication with the movable object efficient and allow other developers to develop applications for the movable object, and that is the general area that embodiments of the invention are intended to address.

SUMMARY

Described herein are systems, methods, storage media, and computer programs that support application development in a movable object environment, wherein protocol independent movable object application may be developed. In one embodiment, a request is received in a first protocol from an application executing on an affiliated device to access a movable object; the request in the first protocol is mapped to a function in an application programming interface (API), where the API is independent of the first protocol; and the movable object is directed to perform the function, via the API.

Also described herein are systems, methods, storage media, and computer programs that support data distribution in a movable object environment. In one embodiment, a request for characteristic data of a movable object is received from a requester of an affiliated device; it is confirmed that the characteristic data is available on the movable object and that the requester has a privilege to access the characteristic data; and then the characteristic data is provided to the affiliated device responsive to the confirmation. In another embodiment, a request for characteristic data of a movable object is transmitted, via a communication adaptor, from a requester of an affiliated device to the movable object, where the request for characteristic data includes information indicative of whether the affiliated device having a privilege to access the characteristic data; the characteristic data from the movable object is received, via the communication adaptor, responsive to the request for the characteristic data; and the characteristic data is provided, via the communication adaptor, to the requester of the affiliated device.

Additionally, described herein are systems, methods, storage media, and computer programs that support communication in a movable object environment. In one embodiment, information for a set of communication parameters that are adapted to be used by different affiliated devices to communicate with a movable object is provided; a modified value for at least one of the set of communication parameters is obtained from an affiliated device; and a connection established between the movable object and the affiliated device is configured based on the modified value for the at least one of the set of communication parameters. In another embodiment, a connection between a movable object and an affiliated device is established, wherein the connection uses a set of communication parameters, values of which are set to default values; a modified value for at least one of the set of communication parameters is obtained, based on values for the set of communication parameters provided by the movable object and values for the set of communication parameters provided by the affiliated device, and the connection is configured based on the modified value for the at least one of the set of communication parameters.

The embodiments of the present invention provide an open and secure movable object environment, where applications in various protocols from affiliated devices may interact with a set of APIs to control a movable object. Additionally, the movable object may distribute its data to an independent affiliated device and/or an independent application in an affiliated device. Furthermore, an affiliated device may negotiate with a movable object to establish a connection with optimized communication parameters.

BRIEF DESCRIPTION OF DRAWINGS

FIG. 14 is an exemplary illustration of entries within a movable object database, in accordance with various embodiments of the present invention.

FIG. 22 is an exemplary illustration of a set of communication parameters, in accordance with various embodiments of the present invention.

DETAILED DESCRIPTION

Figure 1:
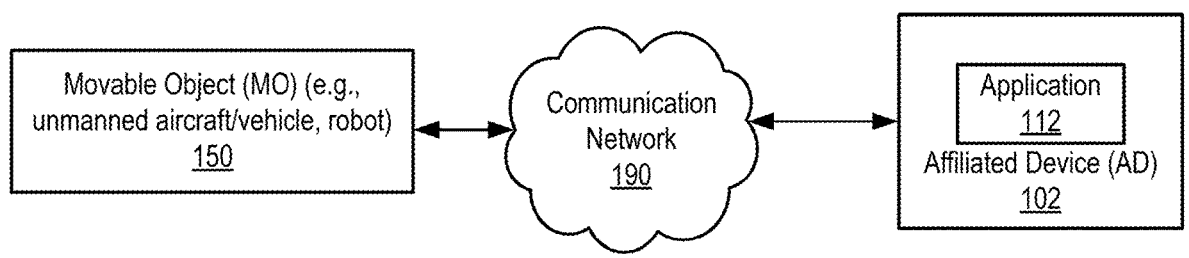
FIG. 1 is an exemplary illustration of an application in a movable object environment, in accordance with various embodiments of the present invention.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

In figures, Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention. Also in figures, reference numbers are used to refer to various element or components, the same references in different figures indicate the elements or components having the same or similar functionalities.

The description of the invention as following uses unmanned aircraft as example for movable objects. It will be apparent to those skilled in the art that other types of movable objects can be used without limitation.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as computer or machine-readable storage media (e.g., magnetic disks, optical disks, read only memory (ROM), flash memory devices, phase change memory) and computer or machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more microprocessors coupled to one or more machine-readable storage media to store code for execution on the set of microprocessors and/or to store data. For instance, an electronic device may include non-volatile memory containing the code since the non-volatile memory can persist code/data even when the electronic device is turned off (when power is removed), and while the electronic device is turned on that part of the code that is to be executed by the microprocessor(s) of that electronic device is typically copied from the slower non-volatile memory into volatile memory (e.g., dynamic random-access memory (DRAM), static random-access memory (SRAM)) of that electronic device. Typical electronic devices also include a set or one or more physical network interface(s) to establish network connections (to transmit and/or receive code and/or data using propagating signals) with other electronic devices.

A movable object is an electronic device that includes one or more propulsion units to propel the movement of the movable object. A movable object can be an unmanned aircraft, an unmanned vehicle, or a robot. One commonality of these movable objects is that no human pilot/driver/operator aboard to control these movable objects. That is, the movement of the movable object, using the one or more propulsion units, is controlled through a different electronic device. An unmanned aircraft is also referred to as an unmanned aerial vehicle (UAV), a drone, or an unmanned aircraft system (UAS), all of which are used interchangeably referring to the unmanned aircraft herein.

An affiliated device is an electronic device that affiliates with a movable object in a movable object environment. An affiliated device may be a wearable electronic device, a handheld electronic device, an onboard electronic device of the movable object, or another movable object. When the wearable electronic device, handheld electronic device, or the other movable object communicates with the movable object wirelessly, they may be referred to as a remote electronic device, in contrast to the onboard electronic device, which communicates with the movable object in a short physical distance (e.g., less than 1 meter). The referred affiliation between the affiliated device and the movable object is typically communicatively coupling (through a communication network) or connecting between the affiliated device and the movable object (through one or more wireline).

FIG. 1 is an exemplary illustration of an application in a movable object environment, in accordance with various embodiments of the present invention. As shown in FIG. 1, an application 112 (note that an application is often referred to simply as an app) in a movable object environment 100 can communicate with a movable object 150 via a communication network 190. The application 112 is deployed in an affiliated device 102 according to one embodiment of the invention.

The communication network 190 may be a variety of wireline or wireless networks. A wireline network is used primarily for communication between a movable object and an onboard electronic device on the movable object (the wireline between the movable object and the onboard electronic device includes one or more physical communication links such as copper lines and optical fibers), while a wireless network can be used for communication between the wearable electronic device, the handheld electronic device, or onboard electronic device the other movable object and the movable object (the wireless signal used in the wireless network is typically radio waves in various frequencies).

The wireline network may deploy technologies such as the universal asynchronous receiver/transmitter (UART) technology, the controller area network (CAN) technology, and the inter-integrated circuit (I2C) technology; and the wireless communication network may deploy technologies such as wireless local area network (WLAN) (e.g., WiFi™), Bluetooth, cellular the third/fourth/fifth generation (3G/4G/5G). The communication network 190 uses a set of communication links to communicate between the movable object 150 and the affiliated device 102, and a link from the affiliated device 102 to the movable object 150 is typically referred to as an uplink and a link in the opposite direction is referred to as downlink. The uplink can be used for transmitting control signals from the affiliated device 102 to the movable object 150, and the down link can be used for transmitting data (e.g., media or video stream) as well as responses to the control signals from the movable object 150 to the affiliated device 102.

Traditionally a movable object vendor provides end-to-end solutions. The vendor provides the application 112 to be installed in the affiliated device 102 (e.g., a remote controller provided by the movable object vendor to control the movable object), and the application is used to control the movable object 150. There are a variety of approaches to ensure the robustness of communication between the affiliated device 102 and the movable object 150 as often the movable object vendor has a limited control over the communication network 190. With reliable communication between the affiliated device 102 and the movable object 150, the traditional movable object environment and vendor's end-to-end solutions can be efficient.

However, the traditional movable object environment is not scalable. As people find more and more usages of movable objects in various fields in commerce, it is desirable to have an open movable object environment, where a developer independent of the movable object 150 and/or affiliated device 102 develops the application 112 to control the movable object 150. The benefit of an open movable object environment includes that the movable object vendor may be free from exploring the various fields and develop applications for those fields, and let the developers specialized in the particular fields to develop applications particularly suitable to those fields. The movable object vendors may then devote their attention to their expertise: making the movable object more versatile, agile, and economic.

In an open movable object environment, a movable object vendor may provide the movable object 150; an affiliated device vendor may provide the affiliated device 102, which may host a variety of applications from different application vendors for different purposes; and an application developer may provide the application 112. The movable object vendor, affiliated device vendor, and application developer may be independent of each other, thus their products (the provided movable object, affiliated device, and application) are independent of each other. For example, the affiliated device vendor may provide only one or more of an onboard electronic device (e.g., a camera/camcorder or a computer), a handheld electronic device (e.g., a remote controller of the movable object, a smartphone, or a tablet/notebook computer) and/or a wearable electronic device (e.g., smart watches, smart clothing, Google® Glass, or electronic device otherwise coupled to a human body) without providing the application to control a movable object. The affiliated device may also be another movable object provided by a different movable object vendor (obviously the affiliated device may be a movable object provided by the same movable object vendor too). At least two of the movable object, affiliated device, and application are independent from each other (e.g., not provided by the same vendor)—otherwise when all of the entities are depend on each other (e.g., all provided by the same vendor), there will be less need to have the open movable object environment.

In one embodiment, an affiliated device provides a platform for application developers to develop their applications, where the platform may be utilized by applications developed by the application developers to interact with and control a movable object.

In the open movable object environment, two interrelated issues are important to address: (1) how to make a movable object environment open so that the movable object may interact efficiently with an independent affiliated device and/or an independent application in an affiliated device and (2) how to make the open movable object environment secure so that the movable object are protected from erroneous controls and/or malicious attacks.

Additionally, an open movable object environment should allow a movable object to distribute its data to an independent affiliated device and/or an independent application in an affiliated device. Also, an open movable object environment should allow a movable object to establish a connection with an independent affiliated device with optimized communication parameters.

Embodiments of the present invention provide solutions to address these issues.

Figure 2:
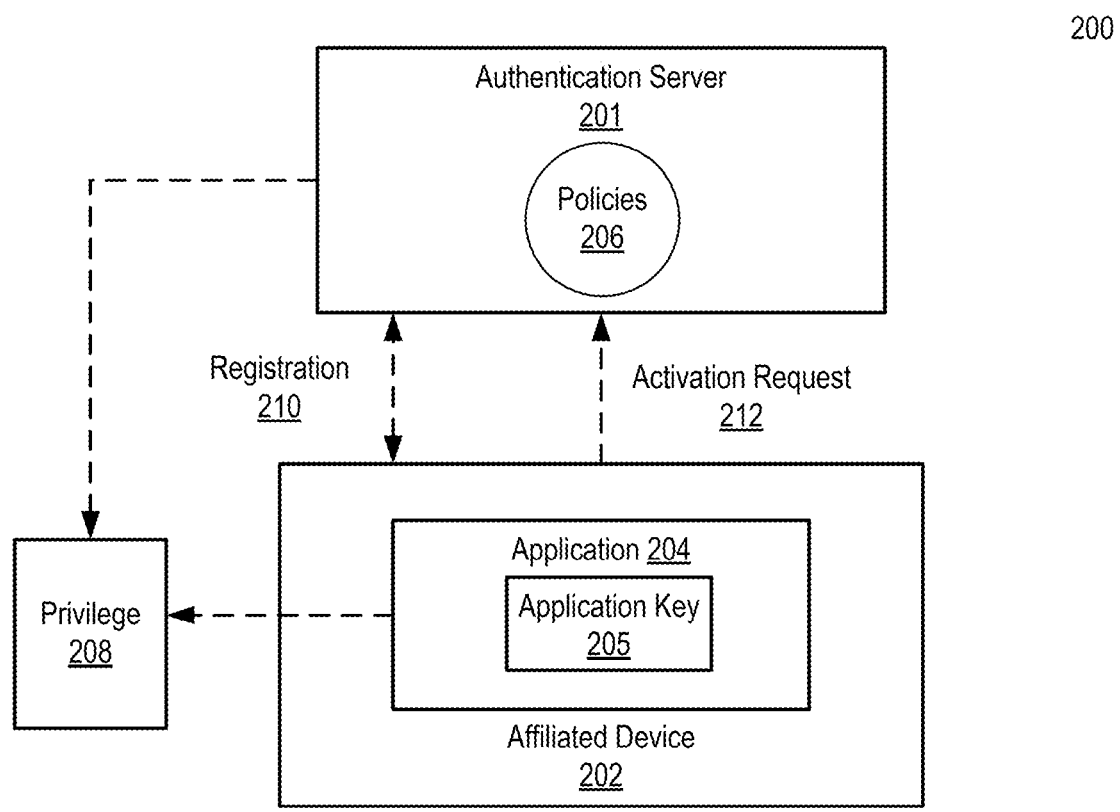
FIG. 2 is an exemplary illustration of using an authentication server for supporting a security model in a movable object environment, in accordance with various embodiments of the present invention.

As a movable object has no human pilot/driver/operator aboard, it is paramount that a movable object environment in which the movable object operates is secure and shielded from abuses or attacks by an actual or faked user. FIG. 2 is an exemplary illustration of using an authentication server for supporting a security model in a movable object environment, in accordance with various embodiments of the present invention. In a movable object environment 200, an authentication server 201 is used for supporting a security model. The authentication server 201 may be a part of a movable object (not shown), and it may also be an entity separated from the movable object, e.g., within a standalone electronic device, or within an affiliated device.

An application is registered with the authentication server 201. The registration involves a developer of the application providing personal information in one embodiment. Based on the information provided during registration 210, the application is provided with a set of privileges.

An application 204 within an affiliated device 202 will be assigned to an application key (often referred to as an app key) 205 by the authentication server 201. The application key 205 may be assigned based on an application identifier (not shown) for the application when it was under development. The application identifier can be a package name in the Android system or a bundle name in the iOS system for the application. In one embodiment, the application identifier is submitted to the authentication server 201 (e.g., through a web portal that in turn direct such information to the authentication server), which assigns the application key 205 to the application 204. An application key binds uniquely with the application identifier, and each application key is associated with a set of privileges. The application key is generated through a cryptographic algorithm (thus the application key may also be referred to as a cryptographic key of the application), and the cryptographic algorithm may be symmetric or asymmetric, and a cryptographic key may be a public key (for encryption or signature verification) or private key (for decryption and sign). The cryptographic algorithm and cryptographic key are known in the art, thus not detailed herein.

The application 204 may initiate an activation request 212 for accessing a movable object (not shown). The activation request 212 may be a request for a privilege 208 to access the movable object. The authentication server 201 may apply one or more policies 206 on the activation request 212 in order to determine whether the application 204 should be granted a privilege 208 for accessing the movable object. The policies 206 may be defined using a variety of criteria such as a maximum installation number, and/or different roles of the application. Additionally, the privilege 208 and policies 206 may also indicate the types of movable object data, movable object functional modules, and movable object interfaces (e.g., application programming interfaces (APIs)) that a particular application may access. In one embodiment, the authentication server 201 makes the privilege grant decision based on the application key 205, which is contained in the activation request 212. Note that the authentication server is required to be involved in communication between the application and the movable object only for the initial activation. Once the application is activated, the application then can communicate with the movable object without the authentication server's further involvement, until/unless the privilege of the application changes.

Additionally, it is to be noted that the application 204 may provide a different privilege to a user of the application than the one it obtains from the authentication server 201. The user may have a lower privilege than the application 204 and the application developer has the control of granting the user's privilege within the privilege it is granted from the authentication server 201.

Additionally, the affiliated device 202 may also register with the authentication server 201. The authentication server 201 may determine that a particular type of affiliated devices has one level of privilege, and all applications resides in that type of affiliated devices can't have privileges higher than that level. For example, a smartphone provided by an independent smartphone vendor being an affiliated device may be assigned to a lower level of privilege than a remote controller provided by the movable object vendor. Additionally, the privilege of an affiliated device may also indicate the types of movable object data, movable object functional modules, and movable object interfaces that the particular affiliated device may access.

Figure 3:
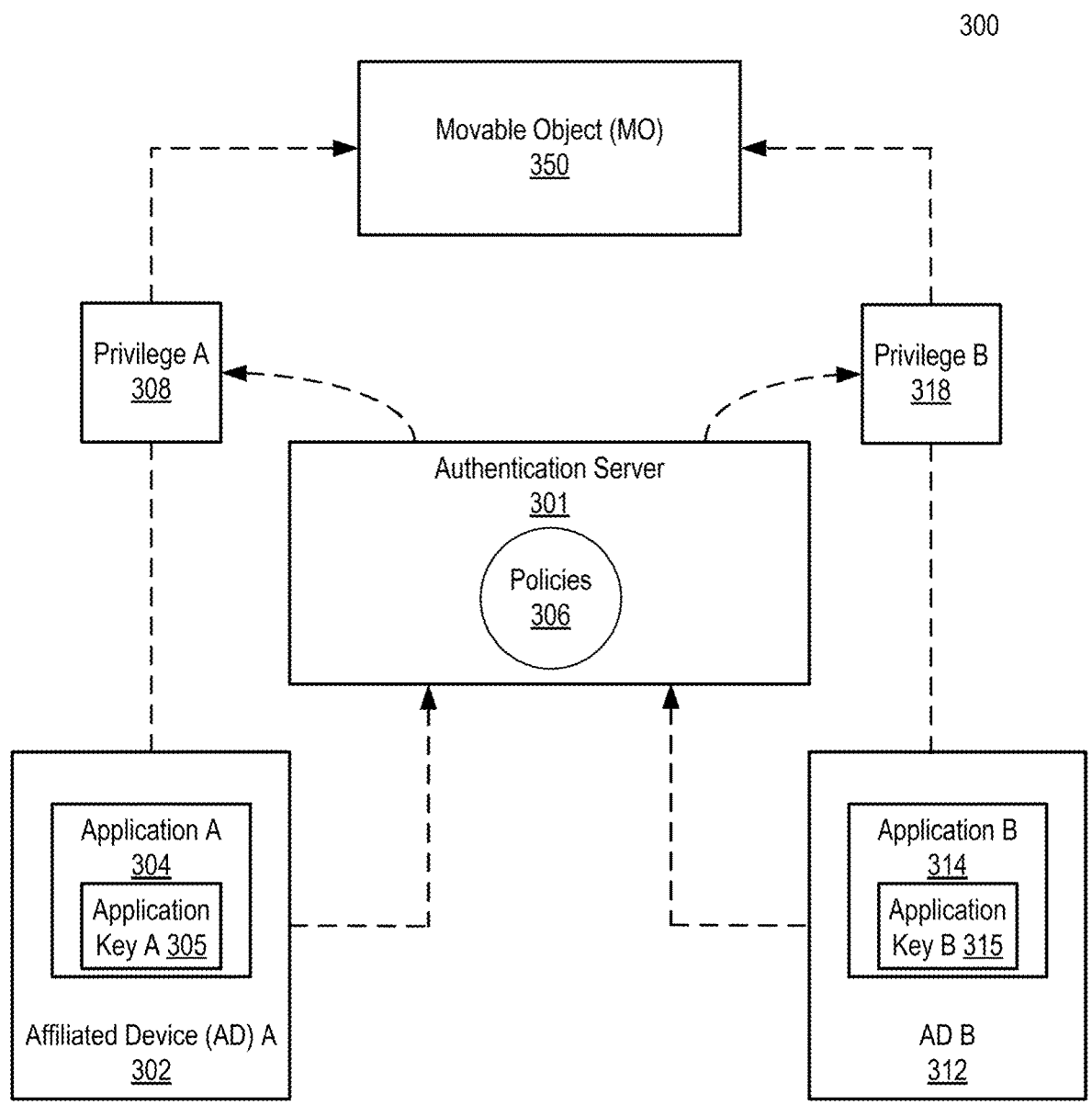
FIG. 3 is an exemplary illustration of using an authentication server for supporting multiple applications in a movable object environment, in accordance with various embodiments of the present invention.

FIG. 3 is an exemplary illustration of using an authentication server for supporting multiple applications in a movable object environment, in accordance with various embodiments of the present invention. As shown in FIG. 3, an authentication server 301 in a movable object environment 300 can be used for handling the activation requests from different applications A-B 304-305, for accessing and controlling a movable object 350, based on one or more policies 306.

For example, the application A 304, which is assigned with an application key A 305, may be granted with a set of privileges, e.g., the privilege A 308. Another application, the application B 314, which is assigned with an application key B 315, may be granted with a different set of privilege, e.g., the privilege B 318.

In accordance with various embodiments of the present invention, the movable object environment 300 is a movable object application development environment that includes a software development kit (SDK), which is used for supporting the development of software application in the movable object environment. The SDK may include a security mechanism, which includes a low level functionality, which is available to applications provided by all registered developers, and a high level functionality, which is available only to application provided by the proved developers. In order to obtain the high level privilege, an applicant may need to go through an approval process, which involves the real name registration (e.g., registration 210 in FIG. 2) and intentional usage statement.

Figure 4:
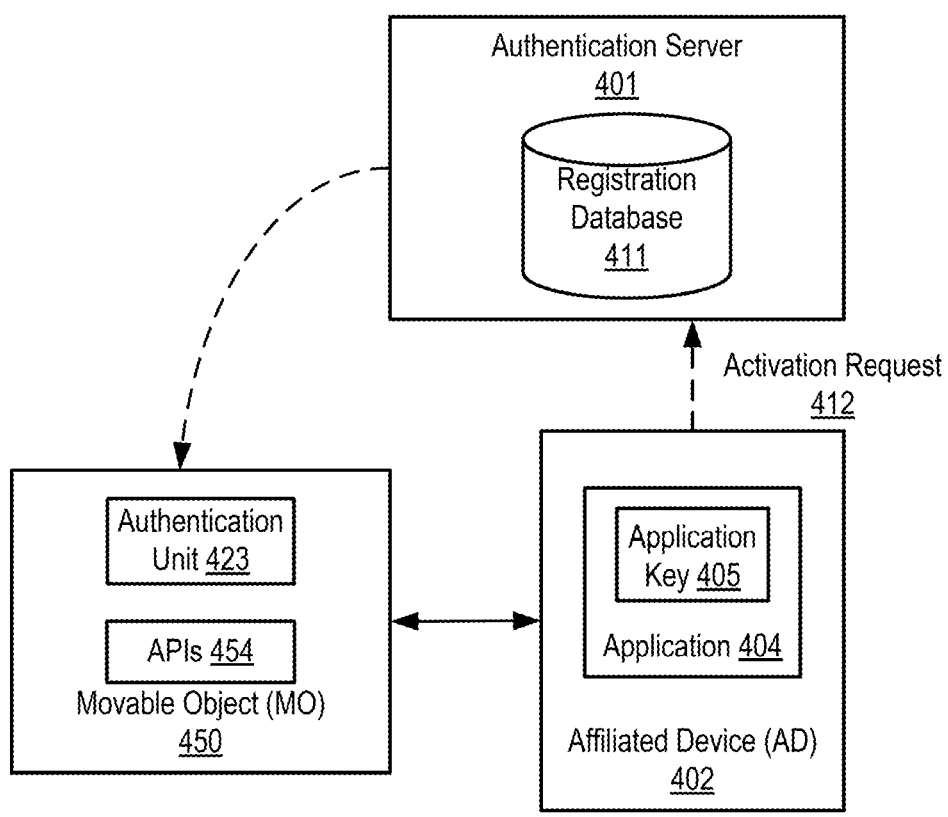
FIG. 4 is an exemplary illustration of supporting a security model in a movable object environment, in accordance with various embodiments of the present invention.

FIG. 4 is an exemplary illustration of supporting a security model in a movable object environment, in accordance with various embodiments of the present invention. As shown in FIG. 4, an authentication server 401 in a movable object environment 400, which is a movable object application development environment that includes a SDK, may receive an activation request 412 from an application 404 for accessing and controlling a movable object 450.

The authentication server maintains a registration database 411. The registration database 411 maintains information regarding various applications. For example, the registration database 411 may maintain a maximum installation number of the application, where the number may be pre-configured or configured dynamically. Then, the authentication server 401 updates an activated application count once the application 404 is activated.

In accordance with various embodiments of the present invention, the authentication server 401 may deny the activation request if the activated application count is equal to or more than the maximum installation number for the application. Furthermore, the authentication server 401 may increase the maximum installation number in response to a privilege upgrade request for the application, or the authentication server 401 may set the maximum installation number to zero to stop illegal, inappropriate, malicious, or malfunctioning applications.

As shown in FIG. 4, an authentication unit 423, based on interaction with the authentication server 401 (e.g., verifying the privilege of the application 404), grants the application 404 a privilege to use one or more application programming interfaces (APIs) 454 for accessing the movable object 450. For example, the movable object 450 may be an unmanned aircraft, the APIs 454 of which includes one or more of a flight controller API, a navigation API, a basic function API, a data distribution API, a camera API, a battery API, and a gimbal API. Additionally, the APIs 454 may include a ground station API, which is associated with the flight controller API, where the ground station API operates to perform one or more flight control operations, which is configured to be only accessible by an application with a particular set of privileges. Additionally, the authentication unit 423, based on interaction with the authentication server 401, may grant the application a privilege to access functional modules of the movable objects such as a flight control module, a gimbal module, a battery module, a camera module, and a communication module, which are discussed in more details in relation to FIG. 8.

At the beginning stage of the application development, the SDK of the movable object environment 400 may only approve a small number of applications, in order to safeguard the application development. After the developer finishing the development, the SDK can check the requirement documents, technique documents, installation documents, and related source codes in an approval process. After finishing the approval process, the SDK can increase the maximum installation number for the application in order to upgrade the application.

In accordance with various embodiments of the present invention, the activation process based on the maximum installation number can be used to prevent the malicious application or inappropriate application. For example, the system can set the maximum installation number to zero in order to prevent the activation of malicious applications. Additionally, the system can deactivate the application, such as preventing the malicious applications from accessing the SDK.

In one embodiment, the registration database 411 maintains information regarding the affiliated devices. For example, the registration database 411 may maintain the privilege level of an affiliated device 402. The affiliated device 402 may be associated with a maximum number of applications that can be running on the affiliated device.

As discussed herein, through the involvement of the authentication sever, the embodiments of the present invention may provide security to the movable object environment to prevent illegal, inappropriate, malicious, or malfunctioning applications to access the movable object, thus provide a secure movable object environment.

A secure movable object environment provides a tool to open up a movable object environment as authentication allows a movable object to be protected from erroneous controls and malicious attacks. Yet in an open movable object environment, the movable object is to accept controls from applications in various protocols, and accommodating various protocols is challenging.

For example, for performing data distribution, a set of APIs may be built, one for each of mobile OS (such as Android, iOS, Windows, and Symbian) and wireline communication (such as UART, CAN, and I2C). For a different application, another set of APIs may be built. Because that movable objects are used in more and more applications in a variety of fields, building and maintaining the ever-growing number of APIs is burdensome in the movable object environment. Additionally, when a new application is developed, a new set of APIs needs to be added. Also, when a movable object vendor offers a new product to the open movable object environment, the movable object vendor needs to upgrade all existing APIs in various applications so that these applications can be used in the new product while maintain compatible with existing products. Such approach with protocol specific APIs is not scalable and hinders the growth of the movable object industry.

In accordance with various embodiments of the present invention, protocol independent APIs are proposed, where an API includes a set of functions so that a movable object is to perform one or more of the set of function as required by an application utilizing the API. The API is independent of protocols so that a request may come from an application in any one of a plurality of protocols, and the API performs the required function as intended by the application.

Figure 5:
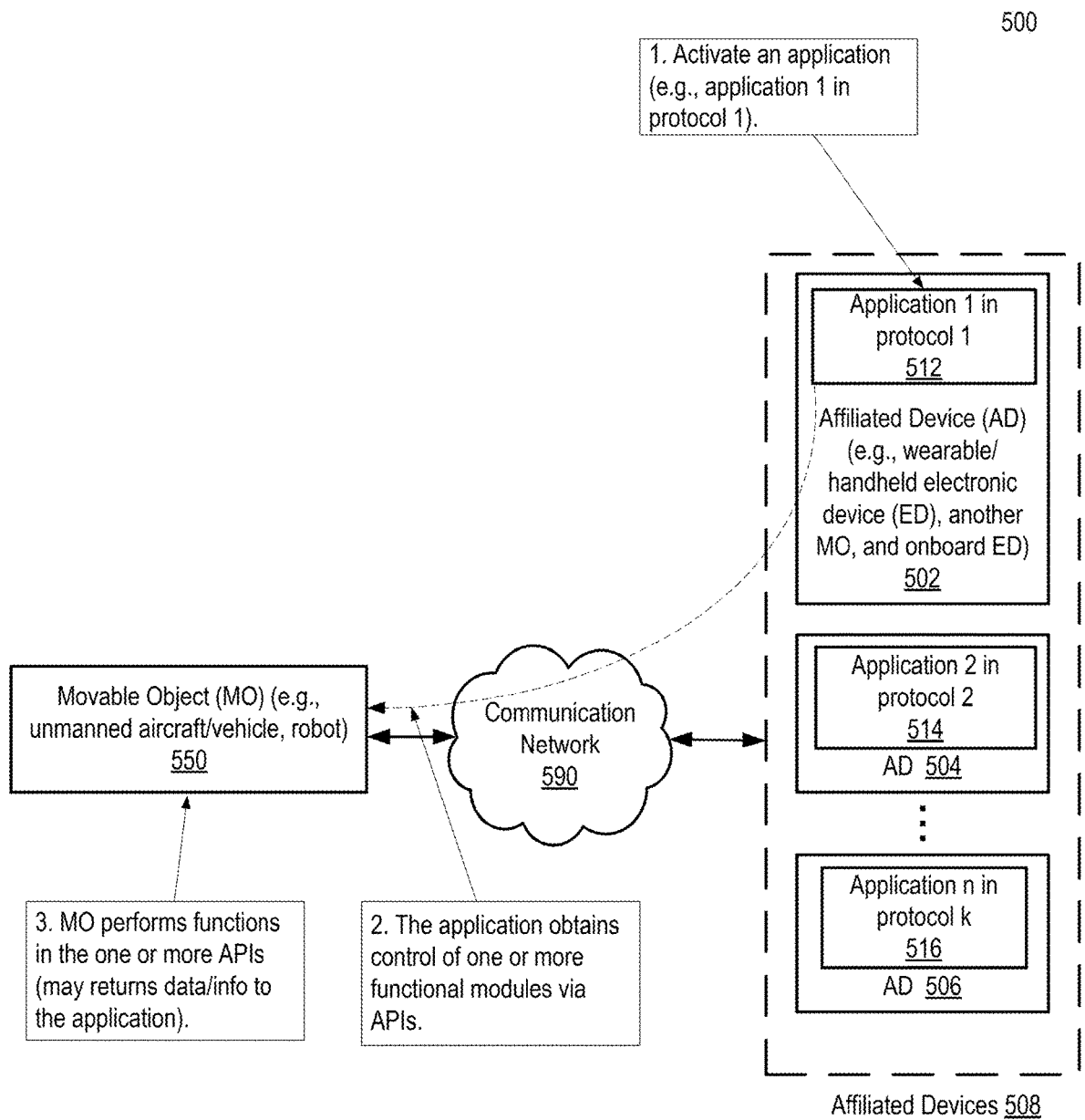
FIG. 5 is an exemplary illustration of a process to utilize a protocol independent API for an application exerting control on a movable object, in accordance with various embodiments of the present invention.

FIG. 5 is an exemplary illustration of a process to utilize a protocol independent API for an application exerting control on a movable object, in accordance with various embodiments of the present invention. As shown in FIG. 5, a movable object environment 500 includes a set of affiliated devices 502-506 referred to collectively as affiliated devices 508, a communication network 590, and a movable object 550, each of which is similar to the similarly referred entities in FIGS. 1-4. As discussed in relation to FIG. 1, at least two of the movable object, affiliated device, and application are independent of each other in one embodiment of the invention.

Each affiliated device in FIG. 5 includes an application in a different protocol, ranging from protocols 1 to k. The applications in different protocols are to illustrate that the movable object environment 500 is open and can accommodate applications in various protocols. Also note that one affiliated device may accommodate a plurality of applications that operate in different protocols, thus the number of applications and the number of protocol count may not match (e.g., the affiliated device 506 contains application n in protocol k, where n can be bigger or smaller than k).

In FIG. 5, task boxes 1-3 illustrate the order in which operations are performed according to one embodiment of the invention. At task box 1, an application, for example the application 1 in protocol 1 at reference 512, is activated. In one embodiment, the activation is through an authentication server such as the authentication server 401, wherein the application initiates an activation request for accessing the movable object to the activation server. The activation is discussed in relation to FIGS. 2 and 4 thus not repeated here.

Once the application is activated, at task box 2, the application obtains control for one or more functional modules of the movable object via one or more APIs, which are independent of the application's protocol (e.g., the one or more APIs are independent of protocol 1, in which the application 1 operates). A protocol independent API allows an application, such as an application provided by a vendor different than that of which provides the movable object, to interact with the movable object. The one or more APIs are, as discussed herein above in relation to FIG. 4, interfaces to access the movable object, and after obtaining control for the one or more APIs, the application may control the movable object.

At task box 3, the movable object 550 performs functions in the one or more APIs. The performance of the function may generate data (e.g., retrieved movable object operation data such as motion data) and/or information (e.g., a response to a request from the application), and the generated data or information may return to the application in the protocol in which the application operates.

Through the process, the protocol dependent application is able to take control of the one or more functional modules, and use the protocol independent one or more APIs to cause the movable object to perform functions, and finally the movable object returns the data and/or information to the application in the protocol. Thus, the movable object is insulated from the plurality of protocols as the movable object performs only functions in the protocol independent one or more APIs, thus the control of the movable object is not burdened with updating and maintaining all the protocol specific APIs.

Figure 6:
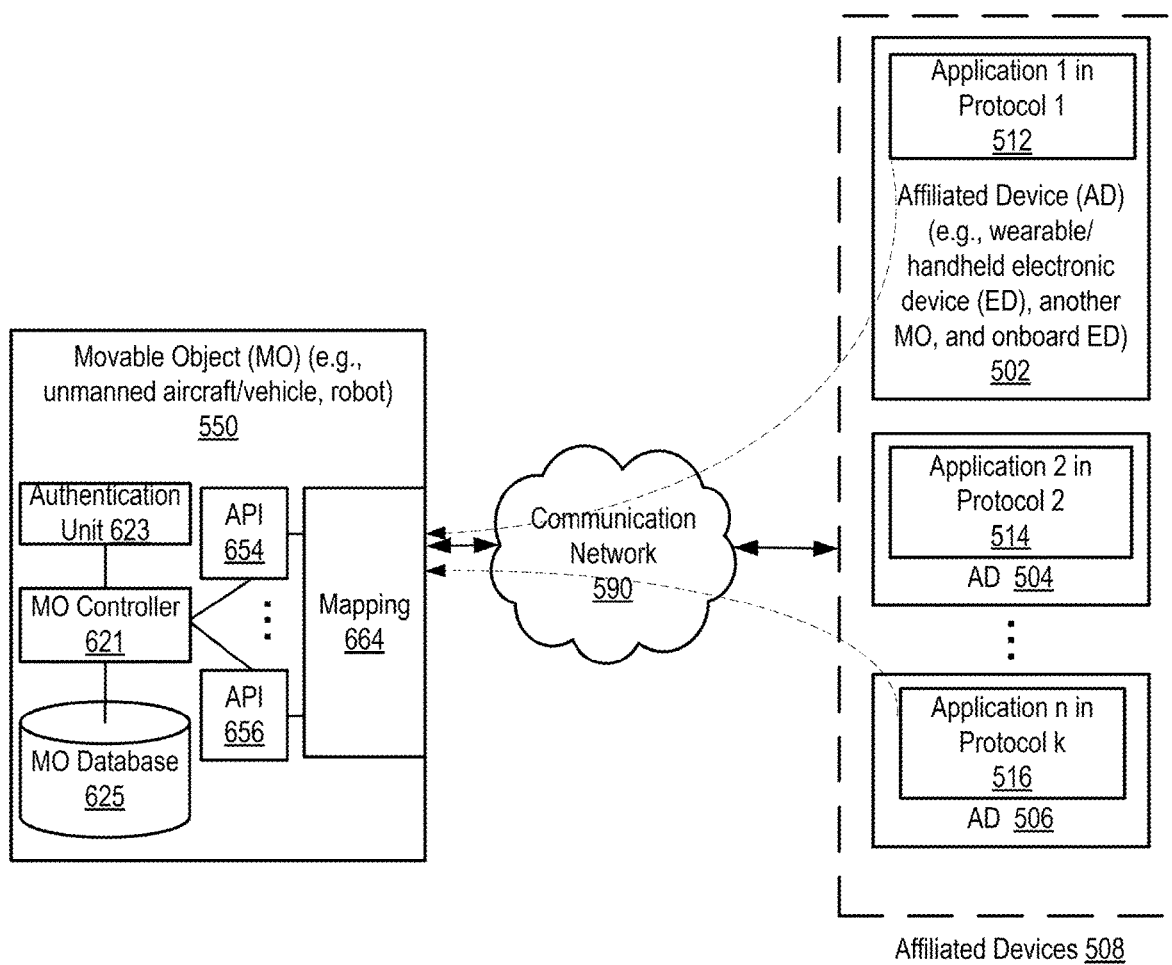
FIG. 6 is an exemplary illustration of a movable object for supporting protocol independent movable object application development in a movable object environment, in accordance with various embodiments of the present invention.

FIG. 6 is an exemplary illustration of a movable object for supporting protocol independent movable object application development in a movable object environment, in accordance with various embodiments of the present invention. As illustrated, a movable object environment 600 is similar to the movable object environment 500, and the same references indicate elements or components having the same or similar functionalities, thus only the additional details in FIG. 6 are discussed.

As illustrated, FIG. 6 provides more details of the movable object 550 according to one embodiment of the invention. The movable object 550 contains a set of APIs 654-656, and each is coupled to a mapping module 664. The set of APIs 654-656 are coupled to a movable object controller 621, which controls the movable object 550. The movable object controller 621 also interacts with an authentication unit 623 and a movable object database 625 in one embodiment of the invention. Note that when the movable object is an unmanned aircraft, an unmanned vehicle, or a robot, the movable object controller is referred to as an aircraft controller, a vehicle controller, or a robot controller respectively, or collectively as simply a controller. It is to be noted that while a single mapping module 664 is illustrated in FIG. 6, in an alternative embodiment, each API may be coupled to its own dedicated mapping module to map requests from applications in various protocols to a function in the API.

In accordance with various embodiments of the present invention, the movable object controller 621, the authentication unit 623, the movable object database 625, the APIs 654-656, and the mapping 664-666, may be part of a software development kit (SDK), which is used for supporting the development of software applications in the movable object environment 600.

The movable object controller 621 controls various functional modules of the movable object 550 in one embodiment. For example, an unmanned aircraft can include a camera module, a battery module, a gimbal module, a communication module, and a flight controller module. The movable object controller 621 establishes and/or manages the communication between the movable object 550 and applications 512-516 within the affiliated devices 502-506 in one embodiment of the invention.

The movable object database 625 contains data produced by and for the movable object 550. For example, the movable object database 625 may include motion data of the movable object 550 (such as the movable object's velocity, position, altitude, and/or period of time in motion) and other movable object's operational status data (such as battery usage and/or available data storage space of a processor of the movable object). The movable object database 625 may include data related to its technical details (identification of the movable object, performance of its processors, etc.). The movable object database 625 may also contain data related to applications and affiliated devices. For example, the data may include identification data of an application so that once an application is authorized to obtain certain types of data, the authorization is recorded in the movable object database 625 and the movable object controller 621 and/or the authentication unit 623 will allow the types of data to be provided to the application without obtaining an authorization for the application repeatedly in the subsequent request from the application. These data of a movable object, including the motion data, other operational status data, movable object's technical details, and the data related to applications and affiliated device are collectively referred to as characteristic data of the movable object herein. While some data are installed prior to the operations of the movable object, others are written during the operations of the movable object. For example, the movable object controller 621 may write the operational status data including the motion data and the data related to applications and affiliated devices in real-time (instantaneously as the data being generated by the movable object) or near real-time (within seconds/minutes after the data being generated), in which case the database is referred to as a real-time database.

It is to be noted while the movable object controller 621 is illustrated as within the movable object 550, in some embodiments one or more of the movable object controller 621, the authentication unit 623, the movable object database 625, the APIs 654-656, and the mapping 664-666 are implemented outside of but communicatively coupled to (e.g., through the communication network 590 or a different communication network) the movable object 550. Additionally, one or more of these modules may be integrated into a single module. For example, a movable object controller may contain one or more of the APIs 654-656, mapping 664-666, authentication unit 623, and movable object database 625. In one embodiment, the movable object controller 621, including the authentication unit 623, is implemented within a remote controller of the movable object 550.

The APIs 654-656 are protocol independent and they perform functions as requested without being aware of how the functions are invoked. For example, mapping 664 maps a plurality of requests in various protocols to the same function of API 654, thus the mapping 664 shields the protocol details of the various protocol from the API 654 and results in the protocol independent API.

Figure 7:
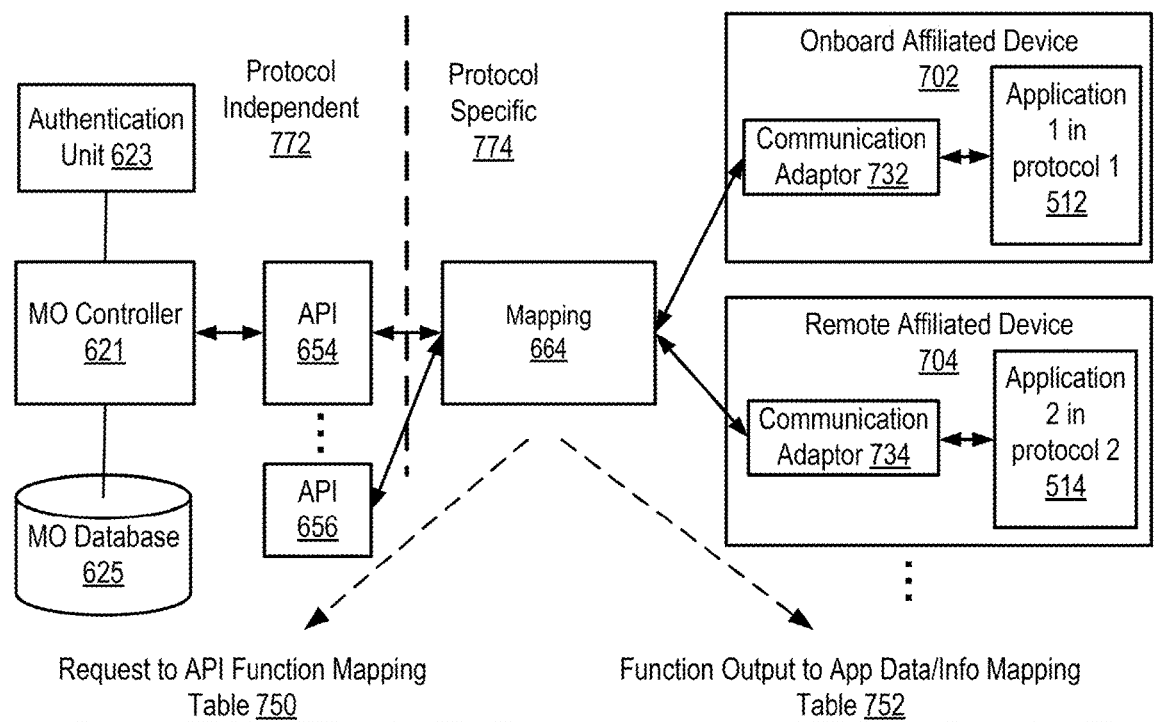
FIG. 7 is an exemplary illustration of protocol mapping in a movable object environment, in accordance with various embodiments of the present invention.

FIG. 7 is an exemplary illustration of protocol mapping in a movable object environment, in accordance with various embodiments of the present invention. FIG. 7 contains entities with the same references as those of FIG. 6, and the same references indicate elements or components having the same or similar functionalities. The movable object environment 700 is divided into two planes: (1) the protocol specific plane 774, where the elements or components within are aware of different protocols and operate accordingly; and (2) the protocol independent plane 772, where the elements or components within are unaware of the protocols that control the movable object.

With such a division, the elements and components within the protocol independent plane 772 are insulated from the changes due to changes in protocols in which the applications operate. In one embodiment, these elements and components, generally closer to the control of a movable object, may be implemented exclusively by a vendor of the movable object, while the elements and components in the protocol specific plane 774 are implemented jointly by the vendor of the movable object and the vendors of the affiliated devices and/or applications. Without the distraction of implementation details of the variety of protocols that applications may operate under, the elements and components within the protocol independent plane 772 may be implemented more efficiently. When an application in a new protocol is to control the movable object, only the protocol specific plane 774 requires update for the new protocol, e.g., adding another mapping to the existing APIs, and no change is required in the protocol independent plane 772. Such division makes the movable object environment scalable, and thus opens the door to use the movable object in more and more diverse fields.

For example, an onboard electronic device typically interacts with the movable object through communication media different from what is used for a remote electronic device: an onboard device typically communicates with the movable object through one or more wireline (physical communication links such as copper lines and optical fibers), while a remote electronic device such as a handheld electronic device or a wearable electronic device communicates with the movable object wirelessly through radio waves in various frequencies. Because of these differences, a movable object environment often provides different SDKs for applications hosted by onboard device and remote devices: an onboard SDK for the former and a mobile SDK for the latter. Within the two SDKs, different APIs are defined for the same or similar functions in different protocols.

By using the protocol independent API, different SDKs and different APIs within the SDKs may be avoided. For example, an onboard affiliated device 702 and a remote affiliated device 704 may utilize the same SDK, and the same API (e.g., API 654) for exerting the same or similar control of the movable object.

In the protocol specific plane 774, each application communicates with the mapping module 664 through a communication adaptor such as communication adaptors 732-732 in one embodiment of the invention. A communication adaptor is a part of a SDK of a movable object environment in one embodiment of the invention. The communication adaptor causes messages (e.g., in the form of commands) in the applications in various protocols to be packaged in a format that is comprehensible in the movable object environment, before the affiliated device transmits the messages toward the movable object. Conversely, the communication adaptor will convert messages received from a movable object by the affiliated device for the applications into messages in the applications. Thus, the communication adaptor converts messages outside of the SDK into messages in the SDK and does the opposite in the reverse direction in one embodiment. A communication adaptor may be an interface of the affiliated device (e.g., an API of the affiliated device) in one embodiment of the invention. The interface is needed as a movable object application is often independent of the affiliated device that hosts the movable object applications.

The mapping module 664 is to convert the request in different protocols into a function of an API. A request to API function mapping table 750 illustrates the conversion. An API 1 function 1 at reference 762 corresponds to different requests in different protocols, so that a request 1 in protocol 1 at reference 742 and a request 1 in protocol 2 at reference 743 both maps to the API 1 function 1. The API 1 function 1 can be a function to create a connection between an application and the movable object. For example, an exemplary function for connecting an application to an unmanned aircraft is OnCreate( ) The function may be mapped to requests in two different protocols: the requests 1 in protocol 1 and protocol 2 at references 742 and 743 respectively. Similarly, an exemplary function for disconnecting the connection between an application and a movable object is OnDestroy( ) to, and that function (e.g., API function 2 at reference 764) may be mapped to requests in two different protocols: the requests 2 in protocol 1 and protocol 2 at references 745 and 746 respectively. When an API function is performed, the API function is associated with the application causing the performance. For example, the application's application key may be mapped to the function. Thus the movable object controller knows which application is performing which API function.

It is to be noted that a function in an API sometimes requires a set of input parameters, which may not be identical to the parameters provided by the request in a protocol, and the request may include more or less than the set of input parameters of the API function. In that case, the mapping module 664 provides adjustment to convert the parameters provided by the request in the protocol to the set of input parameters. For example, the request may indicate a data identifier for the data requested and the API may require an input parameter for a hash value of the data identifier. The mapping module 664 provides the conversion between the data identifier and the hash value of the data identifier. For another example, the API may require an input parameter that is not included in the request in the protocol (e.g., the registration information of the application), the mapping module 664 provides that input parameter (e.g., obtaining the registration information from the authentication unit 623), along with the information included in the request for the other input parameters to the API function.

Once the function is performed on the movable object, the data and/or information generated may need to be returned to the application that has caused the function to be performed. That is, the data and/or information generated may need to be converted back to be in the protocol of the application. For that, the mapping 664 may utilize a function output to application data/information mapping table 752. For example, the API 1 function 1 output 782 is mapped to data/information in protocol 1 and data and/or information in protocol 2 at references 792 and 793 respectively. Based on which application causes the API 1 function to be performed, the output is mapped to the data and/or information in the protocol in which the application operates, being either protocol 1 or protocol 2 in this example.

It is to be noted that the API function output is not necessarily responsive to a request of a particular application, and the movable object may initiate data and/or information transmission to an application too. In other words, the movable object controller 621 may perform a function in an API and determine that the resulting data and/or information needs to be transmitted to an application without the application sending a request first. For example, the movable object controller 621 may determine that application 1 in protocol 1 at reference 512 is malfunctioning, thus it performs an API function (e.g., OnDestroy( ) to disconnect the connection between the application 1 and the movable object, and the output of the API function (e.g., API 1 function 2 output 784) is mapped to data and/or information in protocol 1 (e.g., data/information in protocol 1 at reference 795).

In the movable object environment 700, each request from an application will be mapped to a function in one API. When one request can't map to an existing request to the API function mapping table 750, a new entry needs to be added to map the request to an API function. Similarly, when an application causes an API function to be performed on the movable object, and the performance generates data and/or information for the application, the generated data and/or information needs to be mapped back to data and/or information in the application. When such mapping does not exist, the function output to application data/information mapping table 752 needs to add a new entry for it. Thus, when a new application is created, the mapping module 664 needs to be updated, and the update includes creating new entries or modifying existing entries in the request to API function mapping table 750 and/or the function output to application data/information mapping table 752 in one embodiment. The update of the mapping module 664 may be performed by the vendor of the movable object in cooperation with a vendor of an application and/or a vendor of an affiliated device.

Figure 8:
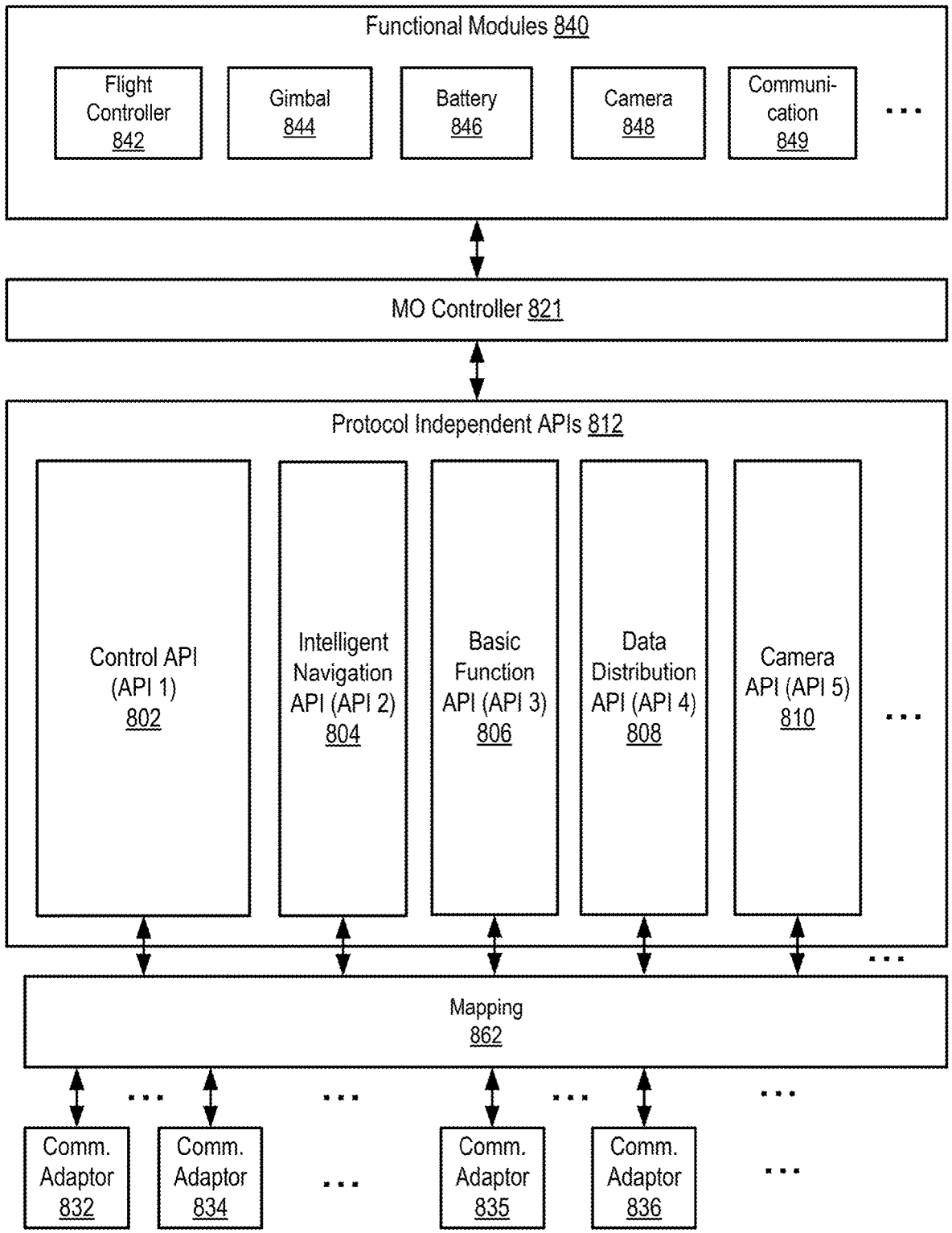
FIG. 8 is an exemplary illustration of organization of APIs in a movable object environment, in accordance with various embodiments of the present invention.

As illustrated in FIG. 7, requests for the same or similar performance are mapping to the same function in the request to API function mapping table 750. Thus API functions are categories based on their purposes. The API function categorization makes protocol mapping more efficient. However, a movable object environment generally has a plurality of APIs, and it is desirable to organize APIs too. FIG. 8 is an exemplary illustration of organization of APIs in a movable object environment, in accordance with various embodiments of the present invention.

As illustrated in FIG. 8, a movable object maintains a set of protocol independent APIs 812. The protocol independent APIs 812 include APIs for different purposes, and each API is given a unique API identifier (ID) in one embodiment. For example, a control API 802, which is for motion control of the movable object, is set to be API 1; an intelligent navigation API 804, which is for the movable object navigating its surrounding, is set to be API 2; a basic function API 806, which is for basic operations of the movable object (e.g., checking a battery level being sufficient enough to sustain the movement of the movable object); a data distribution API 808, which is for the movable object to distribute data, is set to be API 4; and a camera API 810, which is for the still image capture or video recording of a camera of the movable object, is set to be API 5. Thus, with each API identified by a unique API ID, the mapping module 862 may identify the APIs required for a given request in a protocol. The APIs may also include a cloud platform API for supporting cloud services for the movable object and a communication API for the movable object to communicate with affiliated devices and communicating internally within the movable object, these APIs also have unique API IDs but they are not illustrated in FIG. 8 due to figure space constraint.

In operation, an application in a protocol may initiate a request. The request may come from an application coupled to one of the communication adaptors 832-836. The request is sent from an affiliated device through the one of the communication adaptors 832-836, and to the mapping module 862.

At the mapping module 862, the request is mapped to an API of the protocol independent APIs 812. Each API in the protocol independent APIs 812 is identified with a unique API ID in one embodiment, thus through a mapping table such as the request to API function mapping table 750 the request is mapped to a particular API. Since the mapping module 862 provides mapping (1) between requests in various protocols and API functions and (2) between the API function outputs and data/information in various protocols, the mapping module 862 is also referred to be a routing module that routes messages (including requests, data/information) between applications and APIs.

The application may initiate a plurality of requests for control of a functional module of the movable object. The plurality of requests may be mapped to different APIs. As illustrated in FIG. 8, when the movable object is an unmanned aircraft, the functional modules include a flight controller module 842 to manage the flight of the unmanned aircraft, a gimbal module 844 to manage support of an onboard electronic device, a battery module 846 to manage battery power consumption, a camera module 848 to manage still image capture or video recording, and a communication module 849 to manage communication between the unmanned aircraft and an affiliated device. While in one embodiment, one functional module is accessible through a single API (for example, camera API 810 is dedicated to camera module 848), in an alternative embodiment, a single functional module is accessible through a plurality of APIs.

For the control of a functional module, a plurality of functions within a plurality of APIs may be invoked for the application, and the movable object controller 821 coordinates the performance of the plurality of functions in one embodiment. Prior to the application taking control of a functional module, the movable object controller 821 may determine whether the application has the privilege to access the functional module (e.g., through checking an authentication server), and whether another application is in control of the functional module. If the application has the privilege to access and there is no other application in control of the functional module, the application is given the control of the functional module and perform one or more functions in one or more APIs to direct the movable object. If the application has the privilege to access and there is another application in control of the functional module, the movable object controller 821 determines if the application has a higher privilege than the other application. When the application has a higher privilege, the other application is preempted and the corresponding functions in the APIs are no longer performed, and the application takes over the control. Otherwise the application is denied the control of the functional module.

Figure 9:
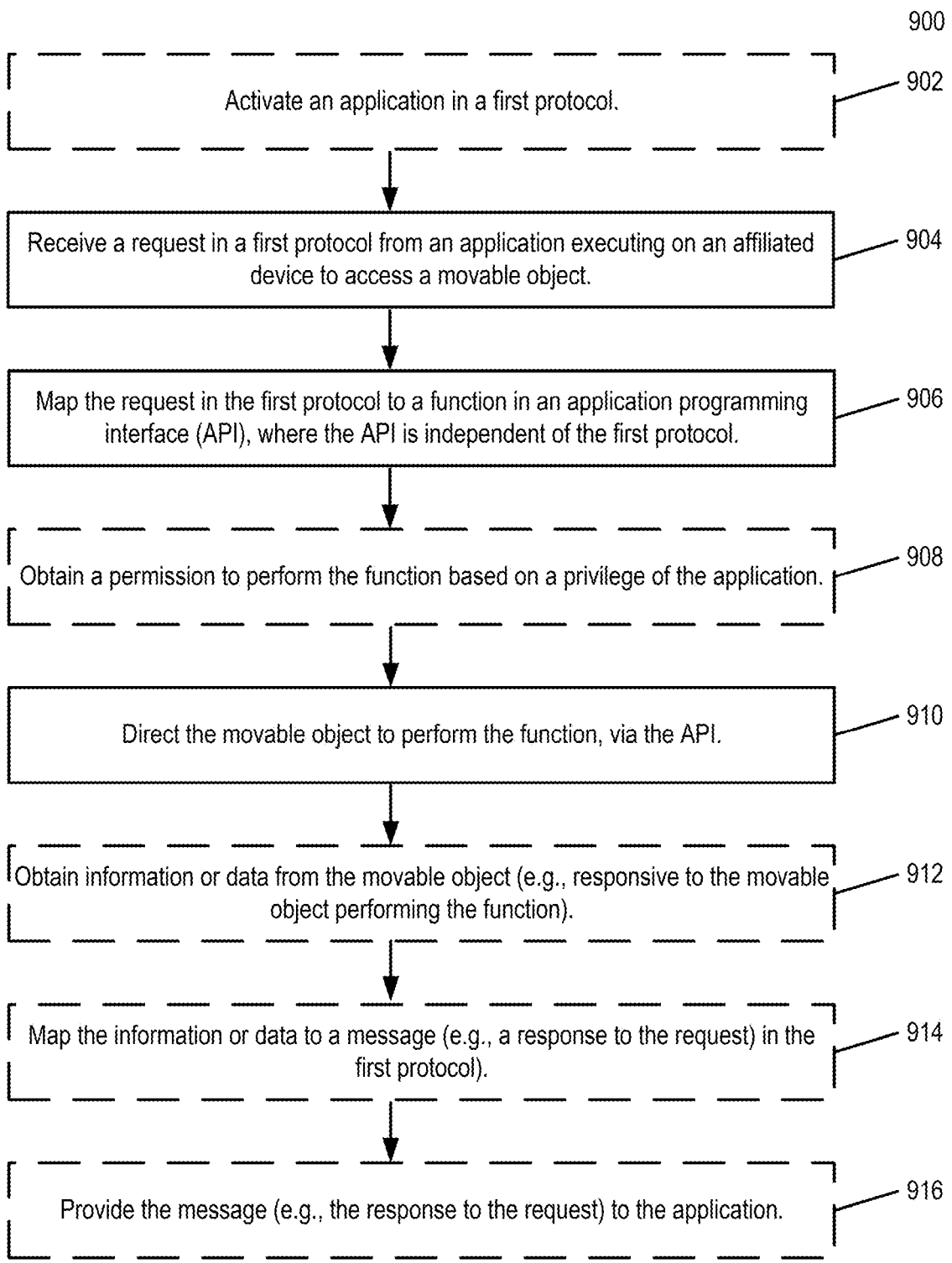
FIG. 9 is a flow diagram illustrating the operations of a protocol independent movable object environment, in accordance with various embodiments of the present invention.

FIG. 9 is a flow diagram illustrating the operations of a protocol independent movable object environment, in accordance with various embodiments of the present invention. Method 900 may be performed by a movable object controller (e.g., the movable object controller 621 or 821 in FIGS. 6-8) of a movable object.

At reference 902, an application in a first protocol is activated. The activation is through an activation request as discussed herein in relation to FIGS. 2, 4 and 5 thus not repeated here. Once the application is activated, a request in a first protocol is received from the application executing on an affiliated device to access a movable object at reference 904.

At reference 906, the request is mapped to a function in an API, where the API is independent of the first protocol. Optionally, a permission is obtained to perform the function based on a privilege of the application at reference 908. Then the movable object is directed to perform the function, via the API at reference 910.

The API allows the application provided by a vendor different than that of which provides the movable object to interact with the movable object in one embodiment. The API is adapted to accept one or more requests from a second protocol, different form the first protocol, for directing the movable object to perform the function in one embodiment. Thus, the API may accept requests from different protocols to direct the movable object to perform the same function. The API is one of a plurality of APIs for the movable object and is responsible for access of a functional module of the movable object in one embodiment. Additionally, in one embodiment, each API of the plurality of APIs is identified with a unique identifier.

In one embodiment, the method 900 continues after operations in reference 910, and information or data from the movable object is obtained for the application at reference 912. The information or data may be responsive to the movable object performing the function triggered by the request in the first protocol in one embodiment.

At reference 914, the information or data is mapped to a message in the first protocol. In one embodiment, the message is a response to the request in the first protocol. At reference 916, the message is provided to the application in the first protocol. The application receives the message through a communication adaptor in one embodiment of the invention.

Figure 10:
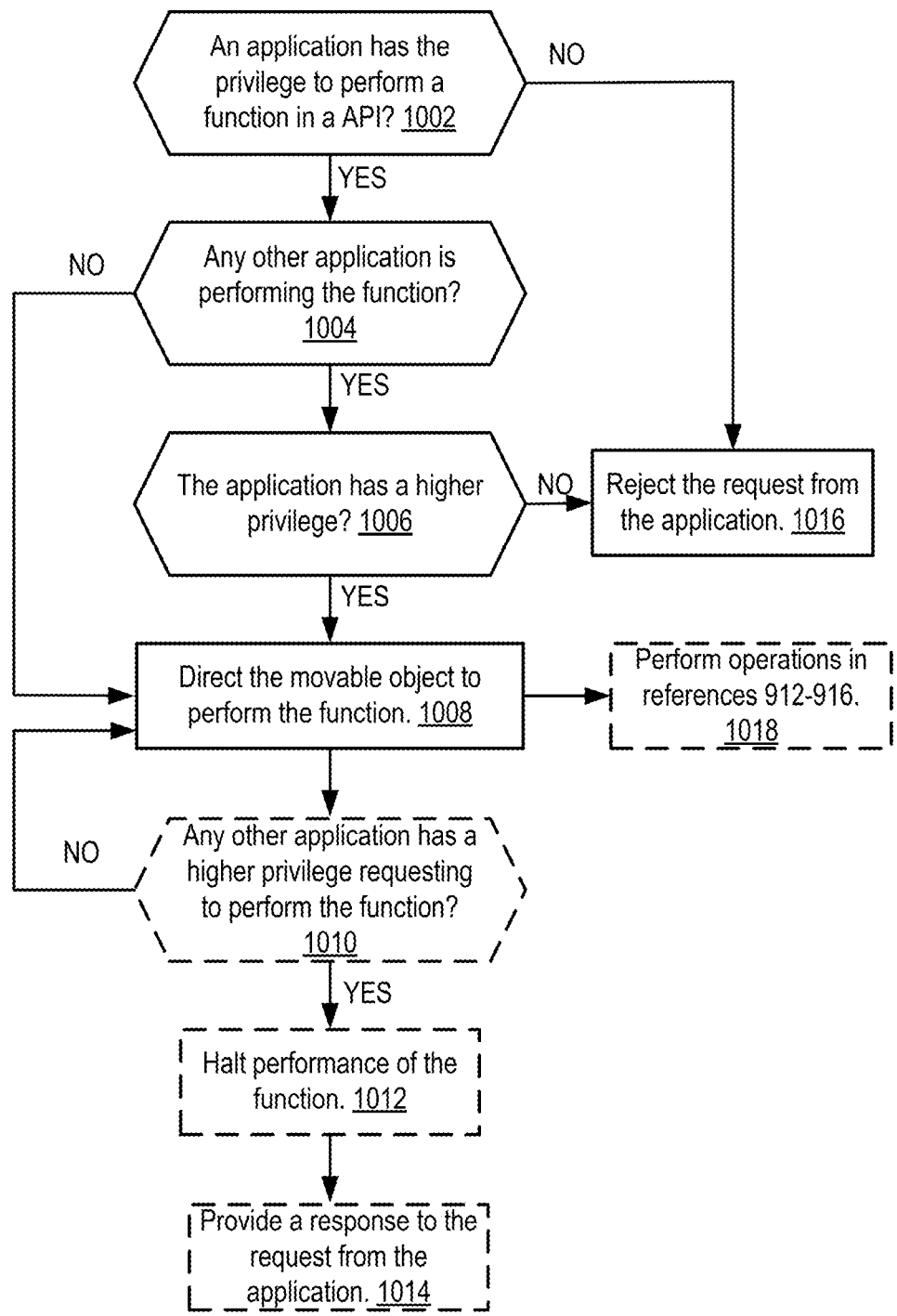
FIG. 10 is a flow diagram illustrating the obtaining of the permission to perform a function based on the privilege of an application, in accordance with various embodiments of the present invention.

FIG. 10 is a flow diagram illustrating the obtaining of the permission to perform a function based on the privilege of an application, in accordance with various embodiments of the present invention. Method 1000 includes details of the operations in reference 908 of FIG. 9 in one embodiment. Method 1000 may be performed by a movable object controller.

A request in a protocol is received from an application executing on an affiliated device to access a movable object. It is determined that the request maps to a function in an API. At reference 1002, it is determined whether an application has a privilege to perform the function. In one embodiment, the determination is through checking an authentication server, e.g., the registration of the application in the authentication server. If the application does not have the permission to perform the function, the request from the application is rejected at reference 1016.

If the application has the privilege to perform the function in the API, the flow goes to reference 1004, and it is determined whether any other application is performing the function. If there is another application performing the function, the flow goes to reference 1006, otherwise the flow goes to reference 1008.

At reference 1006, it is determined If the application has a higher privilege than the other application. If the application does, the flow goes to reference 1008, otherwise the flow goes to reference 1016 and the request from the application is rejected.

At reference 1008, the movable object is directed to perform the function. Afterward, the flow may go to reference 1018, where operations in references 912-916 are performed.

While the movable object performs the function, the movable object controller may determine whether any other application with a higher privilege has a new request to perform the same function at reference 1010. If not, the movable object continues perform the function responsive to the application at reference 1008. Otherwise, the performance of the function for the application is halted at reference 1012. Then at reference 1014, a response to the request is provided to the application. The response may include data and/or information generated by the movable object while executing the function for the application. The response may also indicate the reason of the performance of the function being halted. The response will be received by the application through a communication adaptor in one embodiment of the embodiment.

As discussed, in order to provide an open movable object environment, protocol independent interfaces are provided to applications in various protocols, where the applications may initiate requests to control a movable object. Through a mapping module, where the differences between the various protocols are abstracted away, the protocol independent interfaces do not need to understand the differences between the various protocols, and just perform the functions in the interfaces and direct the movable object perform the functions. Additionally, the mapping module will map the output of the movable object (e.g., output of the API functions), which is protocol independent, into a protocol specific response or message in the protocol in which the initiating application operates.

Such an open movable object environment simplifies the design of the interfaces that control the movable object and the movable object environment becomes more scalable. It is to be noted while the application programming interface (API) is used as the exemplary interface for a movable object, the embodiments of the invention are not limited to the API, and the embodiments of the invention may apply to other software interfaces through which an application may exert control over the movable object.

Through the approaches discussed herein above, a movable object environment supports protocol independent movable object application development, and an application from an affiliated device may direct a movable object to perform operations. In a movable object environment, another important aspect is data distribution from the movable object. Data generated in the movable object should be distributed to an affiliated device if the affiliated device has the privilege to access the data, even if the affiliated device is independent of the movable object.

Through opening up the data distribution to affiliated devices (independent from the movable object or otherwise), a movable object environment enables the affiliated devices (provided by the movable object vendor or a vendor independent of the movable object vendor) to monitor the movable object's status and respond accordingly. Thus an affiliated device, even if it is independent from a movable object, may control the movable object similarly as a controller provided by the vendor of the movable object (e.g. a remote controller dedicated to the movable object and provided by the vendor of the movable object for the purpose of controlling the movable object). The data distribution thus allows an application to be developed for a field that the movable object vendor has less expertise than a developer of the application, where the application may utilize the distributed data for analysis or control of the movable object, thus the movable object may be used efficiently in the field and broaden the usage of the movable object.

Figure 11:
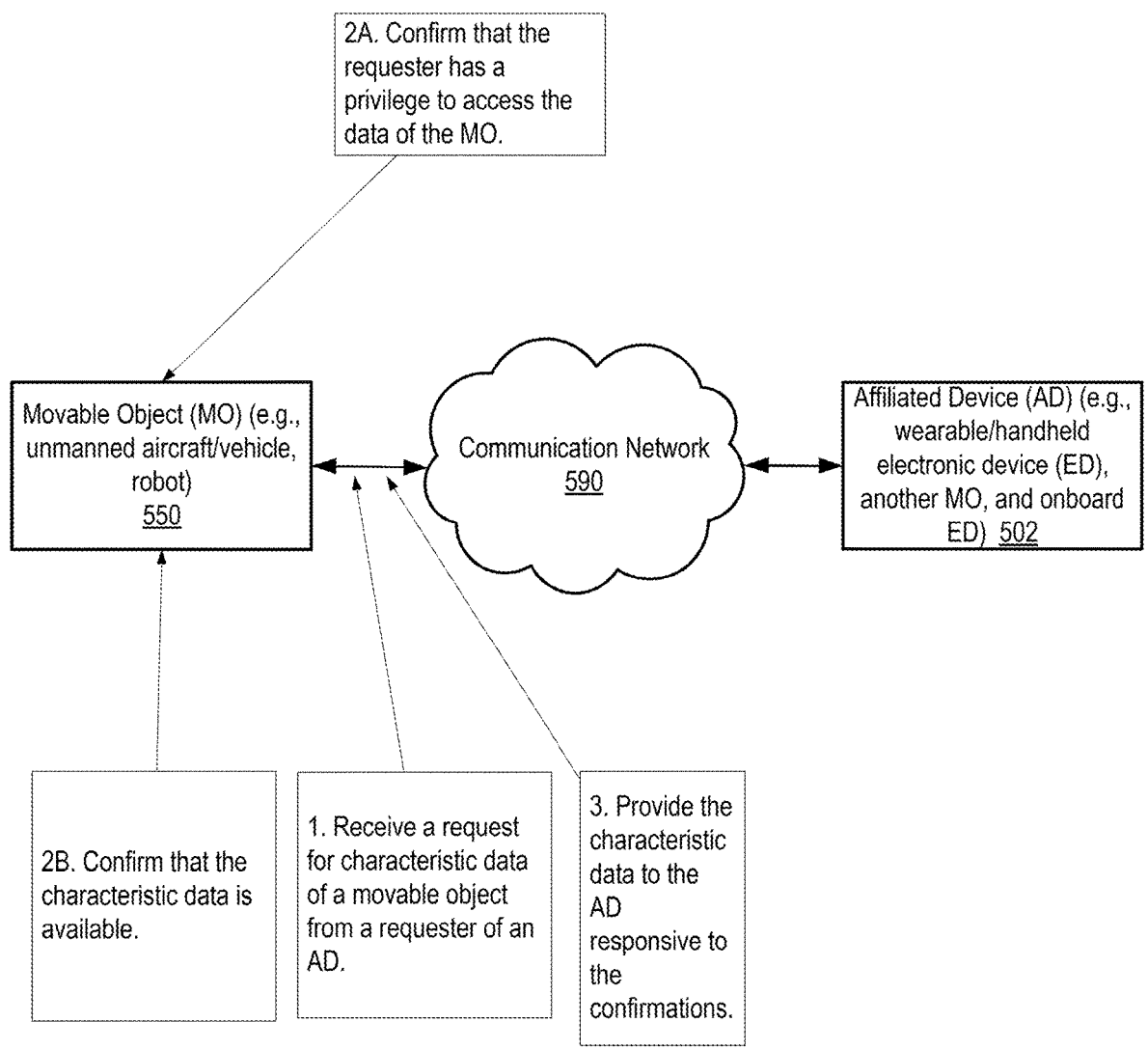
FIG. 11 is an exemplary illustration of data distribution from a movable object in a movable object environment, in accordance with various embodiments of the present invention.

FIG. 11 is an exemplary illustration of data distribution from a movable object in a movable object environment, in accordance with various embodiments of the present invention. The movable object environment 1100 is similar to the movable object environment of FIG. 5, and the same references indicate elements or components having the same or similar functionalities. In FIG. 11, task boxes 1-3 illustrate the order in which operations are performed according to one embodiment of the invention.

At task box 1, the movable object 550 receives a request for characteristic data of the movable object 550 from a requester of an affiliated device 502. The requester is an application executing on the affiliated device, wherein the application initiates the request for characteristic data through an application programming interface (API) that allows the application provided by a vendor different than that of which provides the movable object to interact with the movable object in one embodiment. The API is a protocol independent API discussed herein in one embodiment.

At task box 2A, the movable object 550 confirms that the requester has a privilege to access the characteristic data of the movable object 550. At task box 2B, the movable object 550 confirms that the characteristic data is available. The two confirmations may occur at the same time or sequentially (where either confirmation being done first is acceptable). The confirmation of the requester having the privilege to access the characteristic data is performed through checking with an authentication server in one embodiment. For example, when the requester is an application, the confirmation comprises checking whether the registration of the application in a registration database within the authentication server (e.g., the registration database 411 of the authentication server 401) indicates that the application has the necessary privilege to access the characteristic data.

Then at task box 3, the movable object 550 provides the characteristic data to the affiliated device responsive to the confirmations.

Figure 12:
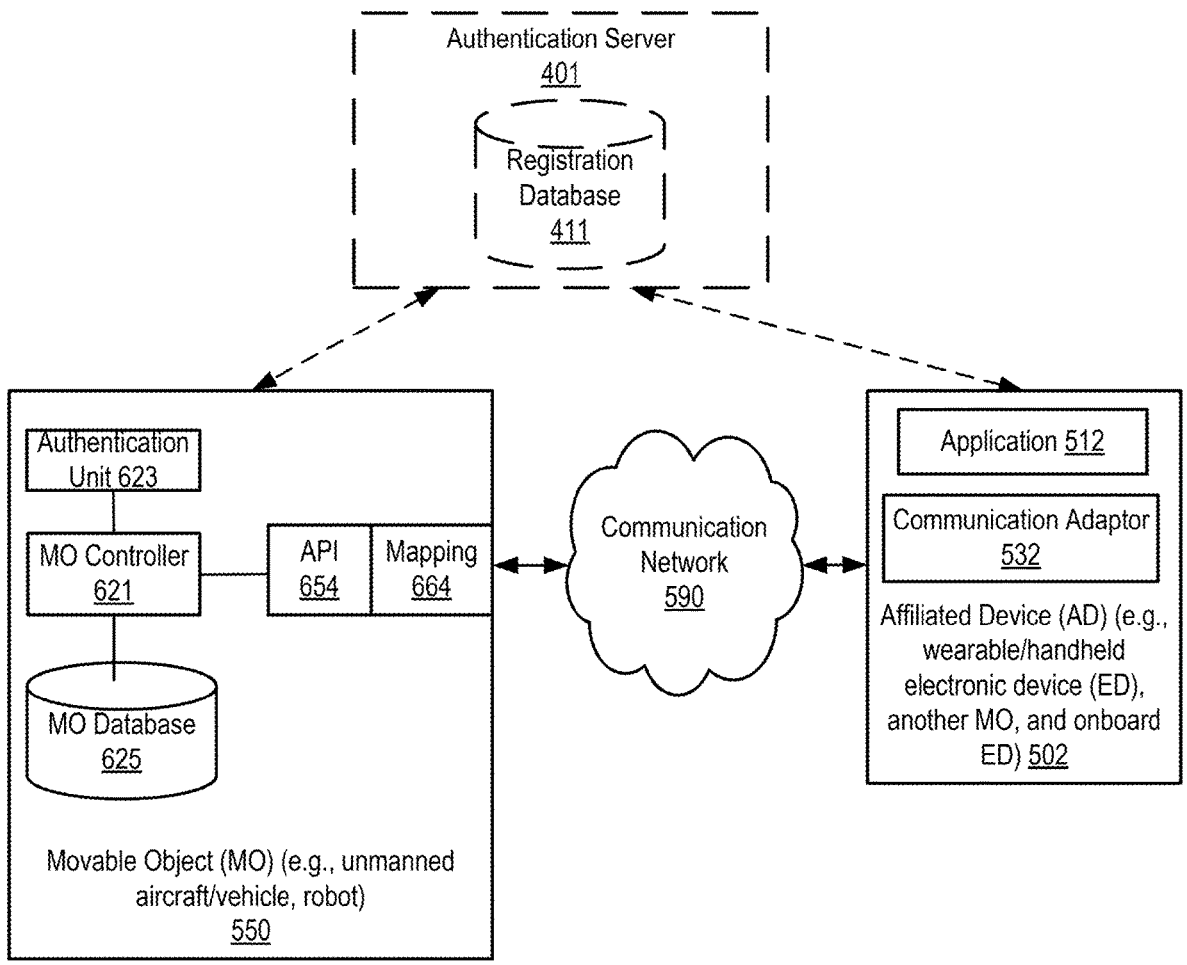
FIG. 12 is an exemplary illustration of details of a movable object and an affiliated device for data distribution from the movable object in a movable object environment, in accordance with various embodiments of the present invention.

FIG. 12 is an exemplary illustration of details of a movable object and an affiliated device for data distribution from the movable object in a movable object environment, in accordance with various embodiments of the present invention. The functional units illustrated in the movable object 550 in FIG. 12 are similar to the ones in FIG. 6, and the same references in FIG. 12 indicate the functional units having the same or similar functionalities as in FIG. 6.

At the movable object 550 side, the movable object controller 621 coordinates data distribution from the movable object, and it operates to confirm the availability of the characteristic data and the requester's privilege to access the characteristic data, and provide the characteristic data. In one embodiment, the confirmation of the requester's privilege is performed through the authentication server 401 and the registration database 411 of the authentication server 401, operations of which are discussed in relation to FIG. 4 herein above.

The characteristic data is stored in the movable object database 625. The movable object database 625 includes characteristics data such as the motion data and data related to applications and affiliated devices of the movable object 550 as discussed herein above in relation to FIG. 6.

At the affiliated device 502 side, the requester is the application 512 in an embodiment, and the interactions between the application 512 and the movable object 550 go through a communication adaptor 532.

In one embodiment, the affiliated device 502 transmits the request for characteristic data of the movable object from the application 512, via the communication adaptor 532. The request for characteristic data includes information (e.g., an application key) indicative of whether the affiliated device having a privilege to access the characteristic data. Then the affiliated device 502 receives, via the communication adaptor 532, the characteristic data from the movable object responsive to the request for the characteristic data. The affiliated device 502 then provides, via the communication adaptor 532, the characteristic data to the application 512.

The confirmation of the requester having the privilege to access the characteristic data is performed through checking with an authentication server in one embodiment. The confirmation of the availability of the characteristic data is through checking a movable object database 625 in one embodiment.

Figure 13:
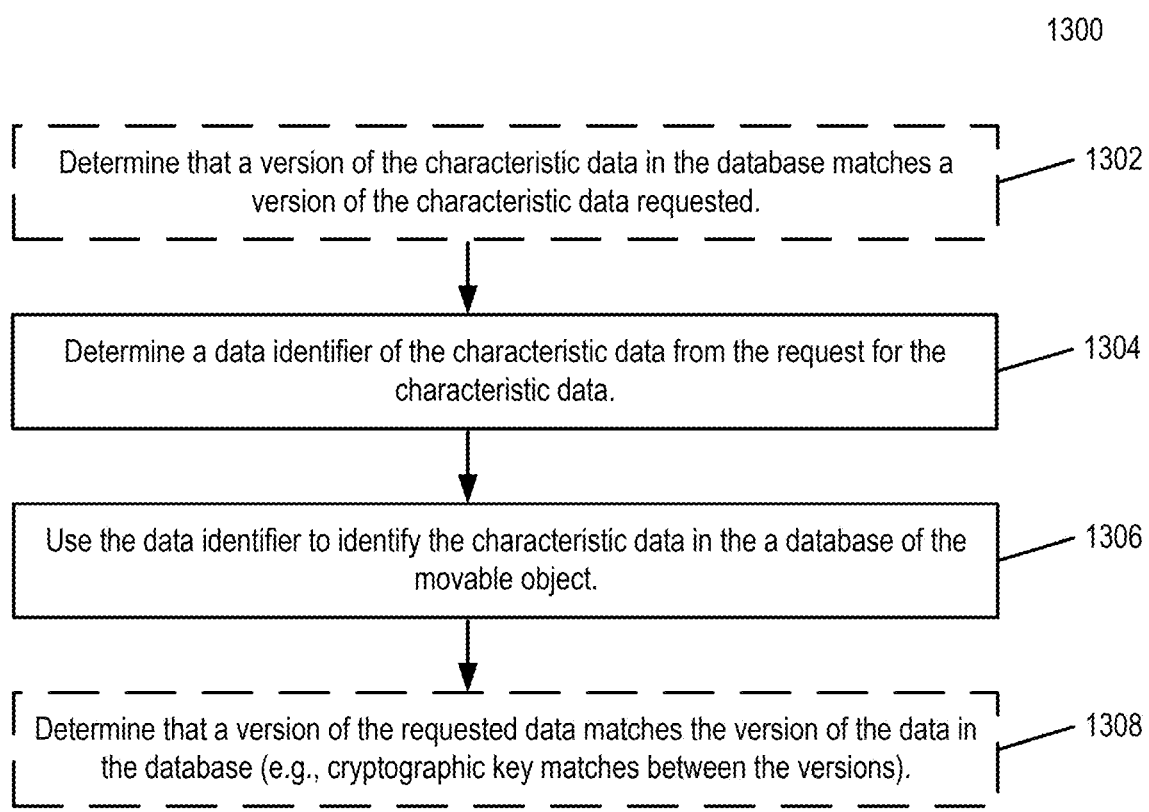
FIG. 13 is a flow diagram illustrating the confirmation of the availability of the characteristic data through checking a movable object database, in accordance with various embodiments of the present invention.

FIG. 13 is a flow diagram illustrating the confirmation of the availability of the characteristic data through checking a movable object database, in accordance with various embodiments of the present invention. Method 1300 is performed in a movable object environment according to one embodiment of the invention. In one embodiment, method 1300 is responsive to a movable object receiving a request for characteristic data of the movable object from a requester of an affiliated device. The movable object database is within a movable object in one embodiment, and outside of the movable object in an alternative embodiment.

Optionally at reference 1302, it is determined whether a version of the database matches a version for the characteristic data requested. The request contains information indicative of the version of the characteristic data requested. For example, the request may indicate the version of the characteristic data, or a cryptographic key generated based on the version of the characteristic data. The version of the characteristic data is then compared to the version of the database, or the cryptographic keys of the requested data and the database are compared, and if a match is identified, method 1300 continues to reference 1304, otherwise, an error will be indicated. Upon getting the error, the movable object will return an error indication to the requester of the affiliated device.

At reference 1304, a data identifier of the characteristic data from the request for the characteristic data is determined. The data identifier may be one or more of a field name of the characteristic data, a hash of the field name, and a sequential order of a field for the characteristic data. The data identifier may be in plain text or it may be encrypted.

At reference 1306, the data identifier is used to identify the characteristic data in the database of the movable object. If no match is found, an error will be indicated. Upon getting the error, the movable object will return an error indication to the requester of the affiliated device.

In one embodiment, the data in the database has a version, and a match for the characteristic data requires a version match too. Thus optionally at reference 1308, a version of the characteristic data in the database is determined to match a version for the characteristic data requested, then it is determined that the matching characteristic data is available in the database, and the identified characteristic data is the data for the request. Again, if no match is found, an error will be indicated. Upon getting the error, the movable object will return an error indication to the requester of the affiliated device.

FIG. 14 is an exemplary illustration of entries within a movable object database, in accordance with various embodiments of the present invention. A movable object database 1400 indicates a version of the database, which is 12.1.00. The database version and/or the cryptographic key generated based on the version is matched against the version and/or the cryptographic key generated based on the version of the requested characteristic data in one embodiment of the invention as discussed herein above.

Data in the movable object database 1400 is indexed by data identifiers 1402, and data has a version numbers 1404 and the values 1406. The data identifiers 1402 are the field names of the characteristic data. In alternative embodiments, the data identifiers may be hashes of the field names (through one or more hash functions applying to the field names) or a sequential orders of fields (e.g., field 1 corresponds to velocity, field 2 corresponds to position, etc.). In one embodiment, there is no separate data version information such as the data version number 1404, rather, the data version information is embedded within the data identifiers 1402. For example, data identification of data and its data version together form a data identifier, thus for the same data type (e.g., velocity), the data identifiers are different when the data versions are different.

In this example, the data includes the movable object's velocity in meter per second 1410, position in GPS coordinate 1412, altitude in meters 1414, and period in motion in minutes 1416. The data versions of the data are different for the illustrated data items. In one embodiment, the versions between the requested data and the characteristic data in the database needs to match exactly. For example, if the requested data of a request is for version 12.1.00, the movable object velocity, which is in version 11.4.00, is not a match, thus even though the movable object velocity data is in the movable object database 1400, the data is determined to be unavailable for the request. In an alternative embodiment, the earlier version of data in the database is considered compatible to the requested later version data, thus the velocity data at version 11.4.00 is compatible to the requested version 12.1.00 (often referred to as backward compatible) and the value 2 meter/seconds are provided to the requester of the data. Typically, a later version of data in the database is not considered compatible to a requested earlier version data, and the data is determined to be unavailable for the requester for the earlier version data.

Figure 15A:
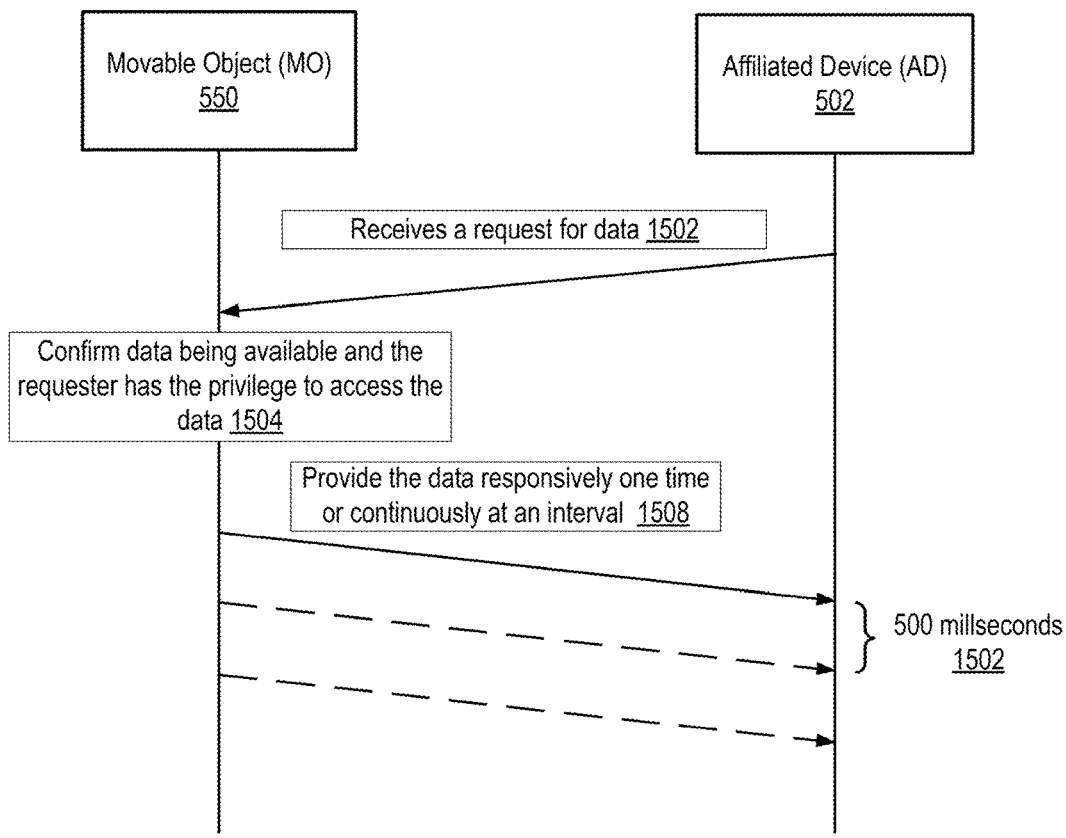
FIG. 15A is an exemplary illustration of data distribution in a movable object environment according to one embodiment of the invention.

With regard to providing data to an affiliated device, embodiments of the invention provide a variety of approaches. FIG. 15A is an exemplary illustration of data distribution in a movable object environment according to one embodiment of the invention.

At reference 1502, the movable object 550 receives a request for characteristic data from a requester the affiliated device 502. At reference 1504, the movable object 550 confirms that that the characteristic data is available on the movable object and that the requester has a privilege to access the characteristic data. Then at reference 1508, the movable object 550 provides the characteristic data to the affiliated device 502 responsive to the confirmation. The data may be provided at one time based on the request for characteristic data. In alternative the data may be provided continuously at an interval based on the request, in which case the request may be referred to as a data subscription request. As illustrated at reference 1502 in FIG. 15A, the data subscription interval is 500 milliseconds in this example. The data subscription interval is often in the range of milliseconds to seconds. For time sensitive data, the data subscription interval may be in the range of 5 milliseconds to 500 milliseconds (2-200 Hz in the frequency domain); for non-time sensitive data, the data subscription interval may be in the range of 500 milliseconds to 10 seconds (0.1-2 Hz). Obviously, other data subscription interval ranges may be implemented depending on the criticality and practicality of data subscription.

For a data subscription request, the interval of the data transmission to the affiliated device 502 may be based on information indicative of the required interval in the data subscription request. For example, the request may specify the interval for data distribution. Alternatively, the interval may be based on the required data type. While the data subscription request itself does not indicate an interval, the movable object 550 may determine a suitable interval of the required data type to transmit the required characteristic data. For example, the movable object may determine the data subscription interval for movable object position to be 20 milliseconds as real-time positional data is time critical for the affiliated device's control over the movable object, yet the data subscription interval for movable object' available data storage space to be ten seconds as the available data storage space is not critical for the control over the movable object.

Additionally, the interval of the data transmission may be updated. For example, the affiliated device 502 may send an updated request for the characteristic data with information indicative of a different subscription interval, and based on the updated request, the data subscription interval can be updated.

Furthermore, the movable object 505 may receive another request for another characteristic data of the movable object from the requester or another requester of the affiliated device 502. The movable object 505 then confirms that the other characteristic data is available on the movable object and that the requester or the other requester has a privilege to access the other characteristic data, and provide the other characteristic data instead of the characteristic data responsive to the confirmations.

Figure 15B:
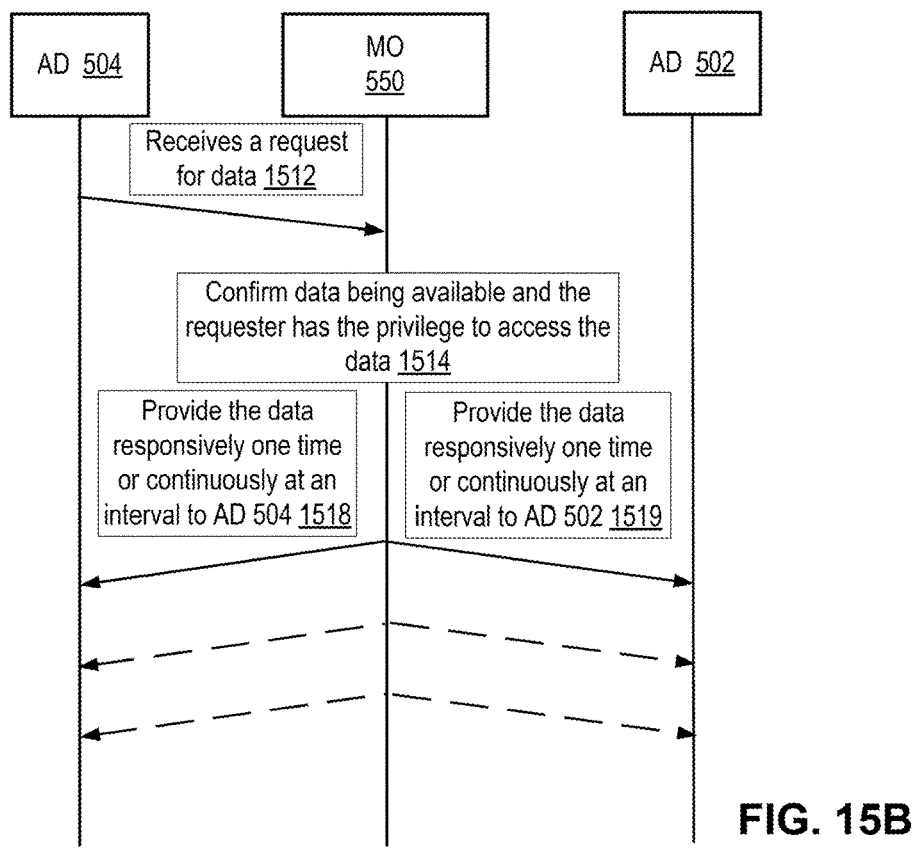
FIG. 15B is another exemplary illustration of data distribution in a movable object environment according to one embodiment of the invention.

FIG. 15B is another exemplary illustration of data distribution in a movable object environment according to one embodiment of the invention. At reference 1512, the movable object 550 receives a request for characteristic data from a requester the affiliated device 504. At reference 1514, the movable object 550 confirms that that the characteristic data is available on the movable object 550 and that the requester has a privilege to access the characteristic data. Then at reference 1518, the movable object 550 provides the characteristic data to the affiliated device 504 responsive to the confirmation. Additionally, the movable object 550 also provides the characteristic data to another affiliated device 502.

That is, once the movable object 550 confirms that the characteristic data is available on the movable object and that the requester has a privilege to access the characteristic data, the movable object 550 may broadcast (i.e., to any affiliated device) or multicast (i.e., to a set of selected affiliated devices) the characteristic data. The choice of broadcasting or multicasting of the characteristic data may be based on the request at reference 1512, which includes information indicative of such choice, and in case of multicast, the criteria to select the affiliated devices to multicast. The choice may also be based on the required data type. While the data request itself at reference 1512 does not indicate whether to provide data only to the requesting affiliated device 504, a group or all affiliated device (including the affiliated device 502), the movable object 550 may determine suitable destination(s) to provide the characteristic data. For example, the movable object 550 may determine to multicast the requested data to all the affiliated devices with the same requester or other requesters with the same or higher level of privilege.

Figure 16:
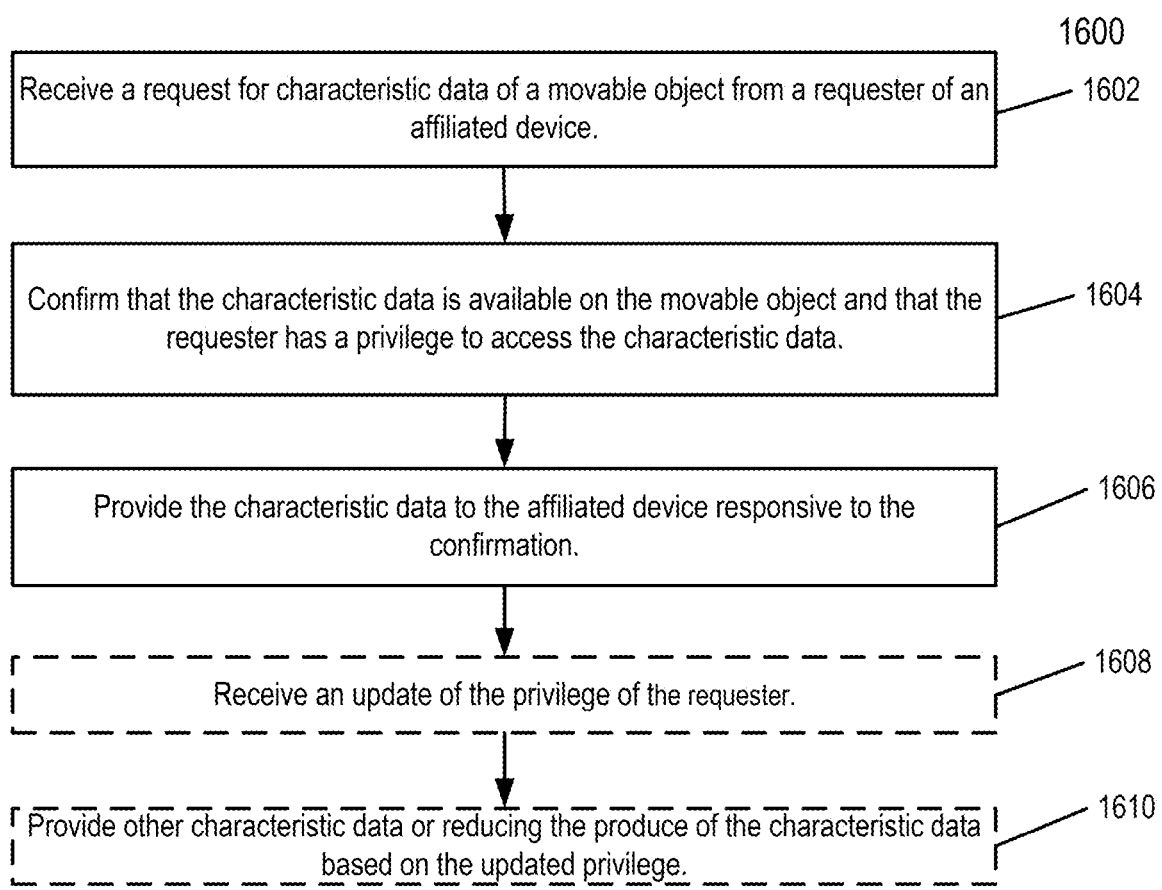
FIG. 16 is a flow diagram illustrating operations at a movable object for data distribution of the movable object, in accordance with various embodiments of the present invention.

FIG. 16 is a flow diagram illustrating operations at a movable object for data distribution of the movable object, in accordance with various embodiments of the present invention. Method 1600 may be implemented in a movable object controller of the movable object in one embodiment of the invention.

At reference 1602, a request for characteristic data of a movable object is received from a requester of an affiliated device. At reference 1604, it is confirmed that the characteristic data is available on the movable object and that the requester has a privilege to access the characteristic data. Then at reference 1606, the characteristic data is provided to the affiliated device responsive to the confirmation.

Optionally, the process continues and an update of the privilege of the requester is received at reference 1608. Then at reference 1610, other characteristic data is provided or provide less of the characteristic data based on the updated privilege.

For example, the update of the privilege may be an increase of the privilege of the requester, thus the requester is allowed to access characteristic data other than what was allowed based on an earlier privilege. In that case, the movable object provides other characteristic data to the affiliated device due to the elevated privilege level. The providing of the other characteristic data may be determined by the movable object controller and without an additional request from the affiliated device in one embodiment.

In contrary, the update of the privilege may be a decrease of the privilege of the requester, thus the requester is allowed to access less characteristic data than what was allowed based on the earlier privilege. In that case, the movable object may no longer provide characteristic data that the affiliated device now has no privilege to access. When the privilege is reduced to the lowest level, the movable object may stop providing characteristic data to the affiliated device all together. Thus, through changing the privilege of the requester (e.g., a setting change for an application in a registration database such as the registration database 411, when the requester is an application), the movable object environment may effectively change the data distribution of a movable object.

Figure 17:
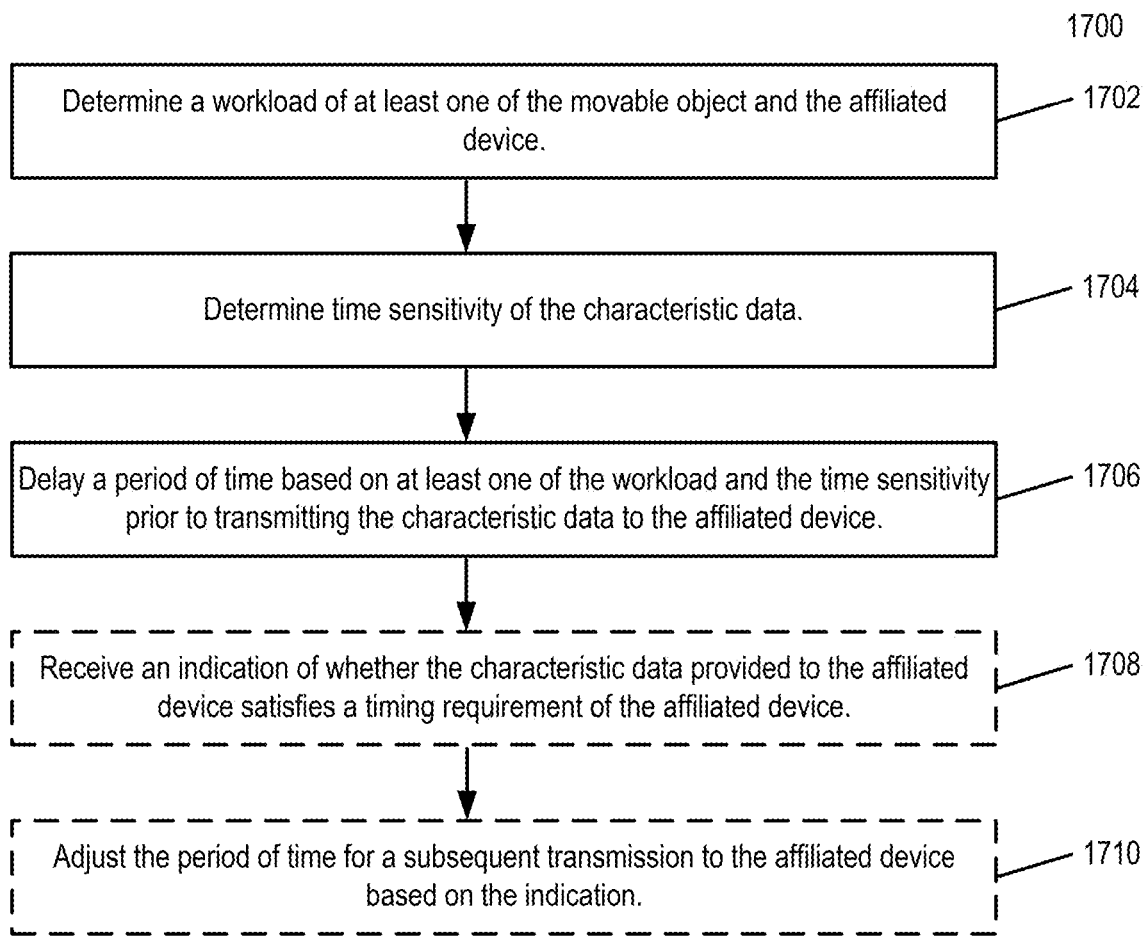
FIG. 17 is a flow diagram illustrating load balancing during data distribution of a movable object, in accordance with various embodiments of the present invention.

During data distribution from a movable object to an affiliated device, the data distribution may produce significant workload at the movable object and/or the affiliated device, and such workload may cause congestion and affect the performance of the movable object and/or the affiliated device. FIG. 17 is a flow diagram illustrating load balancing during data distribution of a movable object, in accordance with various embodiments of the present invention. Method 1700 may be implemented in a movable object controller of the movable object in one embodiment of the invention.

Prior to the operation of method 1700, a movable object has characteristic data to be provided to an affiliated device.

At reference 1702, a workload of at least one of the movable object and the affiliated device is determined. The workload may be indicated as a central processing unit (CPU) usage, available data storage space, and/or communication link (uplink/downlink) delay at the moment for the movable object and/or the affiliated device.

At reference 1704, the time sensitivity of the characteristic data is determined. The characteristic data have different time sensitivity depending on the data type in one embodiment. For example, the motion data of the movable object is typically more time sensitive than the data related to applications and affiliated devices, as the former may be used for real-time control of the movable object by the affiliated device thus they are time sensitive (e.g., allow delays in the order of less than a second) while the latter can tolerate a certain level of delay (e.g., more than a few seconds).

Then at the reference 1706, prior to the movable object transmitting the characteristic data to the affiliated device, a period of time is delayed based on at least one of the workload and the time sensitivity.

For example, the workload at the movable object is determined to be high at the time, and the characteristic data can be delayed (e.g., for an unmanned aircraft, the identification data of an application may be reported a few seconds later without major impact to the performance/controlling of the aircraft), then the characteristic data may be transmitted several seconds later after it is identified in the movable object database. That is, the transmitted characteristic data is near real-time (a few milliseconds later than it is available) in this embodiment.

In an alternative embodiment, after the period of time delay, the characteristic data transmitted is the data sample after the time delay. In other words, the transmitted characteristic data is still in real-time, but it is a later sample of the characteristic data. For example, if a movable object's position data needs to be delayed for a second, the position data after the one second delay is provided. That is, workload balancing causes the movable object provide latter samples of the characteristic data in this embodiment.

Optionally at reference 1708, an indication is received indicating whether the characteristic data provided to the affiliated device satisfies a timing requirement of the affiliated device. At reference 1710, based on the indication, the period of time is adjusted for a subsequent transmission to the affiliate device.

Through workload balancing, the data distribution of the movable object can avoid causing congestion at the movable object and/or the affiliated device, and makes the data distribution of the movable object scalable, particularly when multiple affiliated devices subscribe various characteristic data of a movable object.

Figure 18:
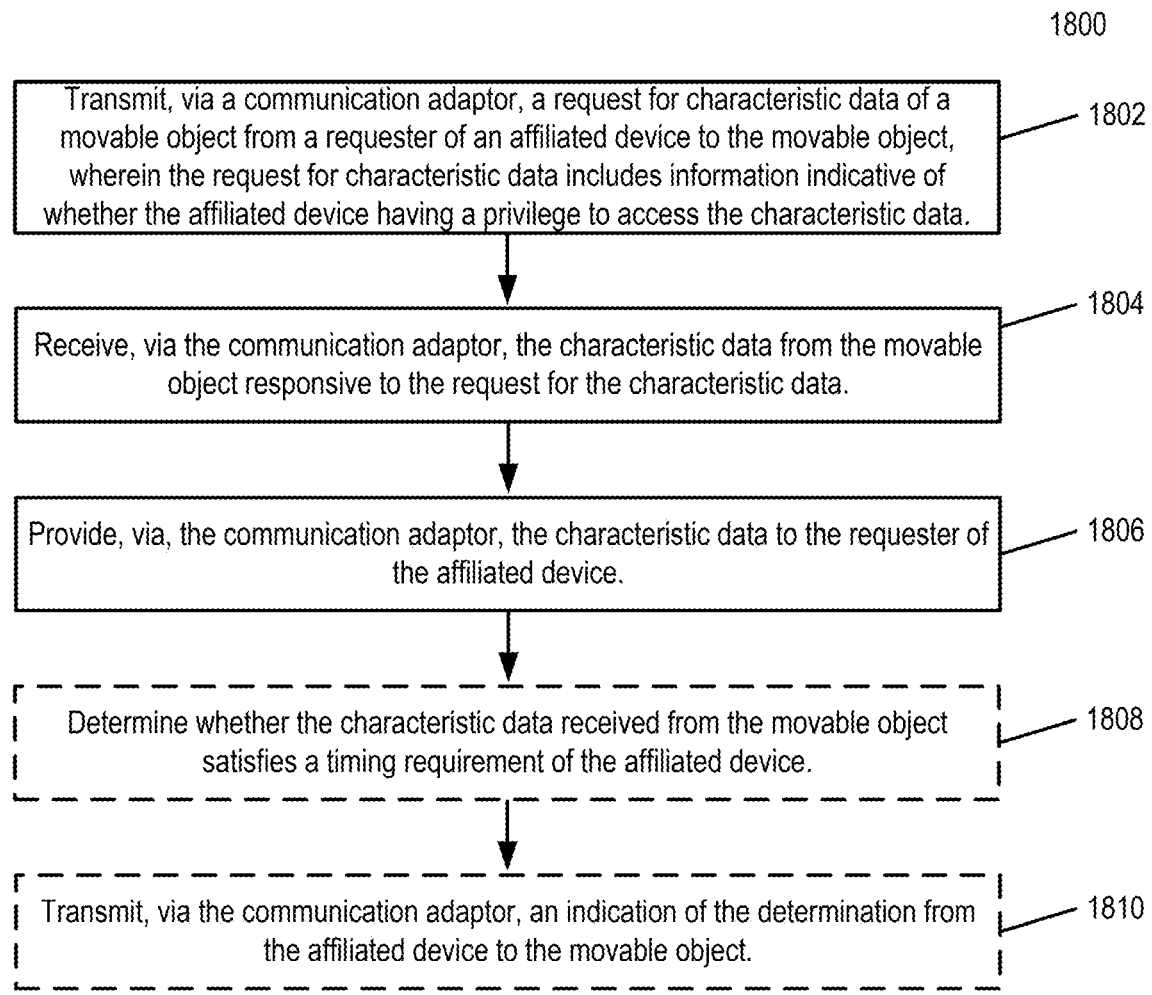
FIG. 18 is a flow diagram illustrating operations at an affiliated device for data distribution of the movable object, in accordance with various embodiments of the present invention.

FIG. 18 is a flow diagram illustrating operations at an affiliated device for data distribution of the movable object, in accordance with various embodiments of the present invention. Method 1800 may be implemented in an affiliated device such as affiliated device 502.

At reference 1802, a request for characteristic data of a movable object is transmitted, via a communication adaptor, from a requester of the affiliated device to the movable object. The request for characteristic data includes information indicative of whether the affiliated device having a privilege to access the characteristic data. The communication adaptor operates to convert the request from the requester to be accepted by the movable object in one embodiment. The conversion includes packaging the request in a format that the affiliated device hosting the application may transmit out the messages toward the movable object.

At reference 1804, via the communication adaptor, the characteristic data from the movable object is received responsive to the request for the characteristic data. Then at reference 1806, the characteristic data is provided, via the communication adaptor, to the requester of the affiliated device. The communication adaptor operates to convert the characteristic data into messages in the requester (e.g., messages in an application).

Optionally at reference 1808, the affiliated device (e.g., the requester) determines whether the characteristic data received from the movable object satisfies a timing requirement of the affiliated device. Then at reference 1810, an indication of the determination is transmitted, via the communication adaptor, from the affiliated device to the movable object.

Through embodiments of the various embodiments of the present invention, a movable object may distribute its characteristic data efficiently to one or more affiliated devices, one time or periodically based on a data distribution interval. The data distribution interval may be updated by either the affiliated devices or the movable object. The data distribution workload may be adjusted through workload balancing. The offered data distribution flexibility makes a movable object environment more friendly to affiliated devices and open the movable object environment to new fields of usage.

In a typical movable object environment, an operator of the movable object environment (e.g., the vendor of a movable object) provides a set of communication parameters to an affiliated device to set up a connection with the movable object. The set of communication parameters provided by the movable object generally uses default values with the goal to accommodate as many different types of affiliated devices as possible, thus the default values are generally the "lowest common denominators" supported among the various types of affiliated devices, and the default values do not take advantage of communication characteristics of a particular affiliated device and/or a particular movable object.

In an open movable object environment, where a movable object communicates with different types of affiliated devices, it is desirable to have each affiliated device to negotiate with the movable object and find optimized communication parameters for the connection between the affiliated device and the movable object.

Figure 19:
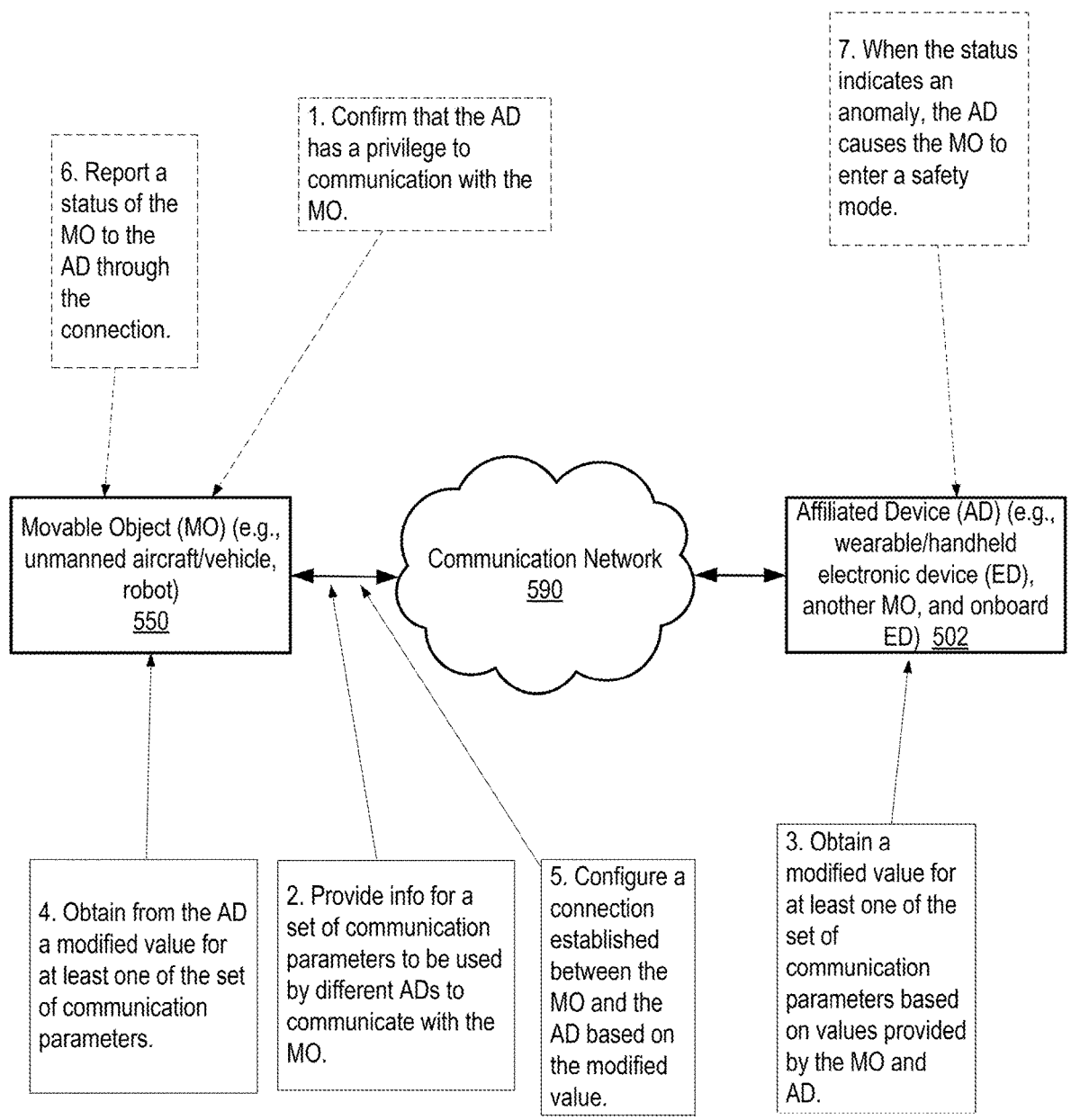
FIG. 19 is an exemplary illustration of a process to update a connection between a movable object and an affiliated device, in accordance with various embodiments of the present invention.

FIG. 19 is an exemplary illustration of a process to update a connection between a movable object and an affiliated device, in accordance with various embodiments of the present invention. As illustrated in FIG. 19, a movable object environment 1900 includes a movable object 550, a communication network 590, and an affiliated device 502, all of which are described herein above. In FIG. 19, task boxes 1-7 illustrate the order in which operations are performed according to one embodiment of the invention.

At optional task box 1, the movable object 550 confirms that the affiliated device 502 has a privilege to communicate with the movable object 550. The confirmation is through checking an authentication server such as the authentication server 401 in one embodiment. For example, the authentication server 401 may indicate that the affiliated device 502 has the privilege to access the communication module 849 and/or the data distribution API 808 through which to cause the communication module 849 to set up a connection with the movable object in FIG. 8, thus it has the privilege to communication with the movable object 550. In one embodiment, the confirmation is to confirm that the affiliated device 502 has a privilege to communicate with the movable object 550 from an application executing on the affiliated device 502 through an API that allows the application provided by a vendor different than that of which provides the movable object 550 to interact with the movable object 550.

After the confirmation, the movable object 550 allows the affiliated device 502 to establish a connection between the movable object 550 and the affiliated device 502. Either the movable object 550 or the affiliated device 502 may initiate or complete the establishment of the connection. Embodiments of the invention covers different protocols/procedures through which the connection is established.

The connection uses a set of communication parameters, values of which are set to default values. In one embodiment, the connection is established from an application executing on the affiliated device 502 through an API that allows the application provided by a vendor different than that of which provides the movable object 550 to interact with the movable object 550. In one embodiment, the movable object 550 extracts a command to connect to connect with the movable object 550 from a request in a protocol from the application, and establishes the connection based on the command. In one embodiment, the API is a protocol independent API discussed herein above, where the API is adapted to accept one or more commands to connect with the movable object extracted from a second protocol, different from the first protocol, for connection establishment for a different affiliated device.

The set of communication parameters includes a bandwidth of the connection, a packet acknowledgement timeout period, a packet retransmission interval, and a size of packet buffer in one embodiment. FIG. 22 is an exemplary illustration of a set of communication parameters, in accordance with various embodiments of the present invention. Each of the movable object and affiliated device has a set of communication parameters, which may be different for different movable objects and affiliated devices. In this example, communication parameters 2202 have a range of values 2204 and default values 2206. For example, the connection bandwidth in kilobyte per second at reference 2210 is in the range of 5-20 KB/s and the default value is 5 KB/s, the packet buffer size in bytes at reference 2212 is in the range of 5-100 bytes and the default value is 5 bytes, the packet acknowledgment timeout period in milliseconds at reference 2214 is in the range of 100-500 milliseconds and the default value is 500 milliseconds, and the transmission retry limit is in the range of 3-6 times and the default value is 3 times.

For different connections (e.g., wireline connection between the movable object and an onboard electronic device vs. wireless connection between the movable object and a wearable electronic device, a handheld electronic device, or another movable object), the sets of communication parameters may be different. The default values for the set of communication parameters may be determined by an operator (e.g., the movable object vendor) of the movable object environment, and the goal of using the default values is to have a set of acceptable communication parameters for various types of affiliated devices so that more affiliated devices may communicate with the movable object. The default values thus are "safe" values, as illustrated in FIG. 22, the default values are for a slower, less capable connection, and/or consuming less processing power (e.g., the default bandwidth being at the lowest end 5 KB/s and the timeout period being at the highest end 500 millisecond). The wide breadth of allowable affiliated devices for connection typically comes with a cost of suboptimal connection, and the default values for the set of communication parameters are often not the ones to provide an optimal connection between a particular affiliated device and a particular movable object.

Referring back to FIG. 19, at task box 2, the movable object 550 provides information for a set of communication parameters that are adapted to be used by different affiliated devices to communicate with the movable object. The information includes values of the set of communication parameters (or an encrypted version of the values) supported by the movable object 550, such as the ranges of values and/or default values, in one embodiment. The information may include product information that an affiliated device may use to determine the supported values of the set of communication parameters by the movable object 550 in one embodiment. For example, the information may be the serial number, model number, or organizationally unique identifier (OUI) of the movable object 550, from which an affiliated device may deduce the supported values of the set of communication parameters by the movable object 550 as the affiliated device may find the supported values from other sources.

At task box 3, the affiliated device 502 obtains a modified value for at least one of the set of communication parameters, based on values for the set of communication parameters provided by the movable object and values for the set of communication parameters provided by the affiliated device. Then at task box 4, the movable object 550 obtains from the affiliated device 502 the modified value for the at least one of the set of communication parameters. In one embodiment, the modified value comparing to a corresponding default value for the at least one of the set of communication parameter indicates at least one of a bigger bandwidth of the connection, a shorter packet acknowledgment timeout period, a shorter packet retransmission interval, and a bigger size of a packet buffer.

At task box 5, the movable object 550 configures the connection established between the movable object and the affiliated device based on the modified value for the at least one of the set of communication parameters.

Optionally at task box 6, the movable object 550 reports a status of the movable object to the affiliated device 502 through the connection. At task box 7, when the status indicates an anomaly, the affiliated device 502 causes the movable object 550 to enter a safety mode. The affiliated device 502 issues a request to the movable object based on the status to cause the movable object 550 to enter the safety mode in one embodiment.

It is to be noted that the modified value at task box 3 may be a temporary modification that is applicable to only the current connection between the affiliated device 502 and the movable object 550. Once the connection is terminated, for the next connection established between the affiliated device 502 and the movable object 550, the default values of the set of communication parameters may be used initially, and operations in the task box 1-5 may be repeated to obtain the same or different modified value for the next connection.

In an alternative embodiment, the modified value at task box 3 is a permanent modification that is applicable to all subsequent connections between the affiliated device 502 and the movable object 550 (unless/until the affiliated device 502 or the movable object 550 causes the change of the modified value). In that case, a subsequent connection will be established using the modified value, and the modified value may be updated again (temporarily or permanently as explained) through the operations in the task box 1-5.

The safety mode may have several levels, based on the severity of the anomaly. For example, when the movable object 550 is an unmanned aircraft, the safety mode may be return-to-home (RTH). When the anomaly is severe and the affiliated device 502 determines that it has lost communication with the movable object 550 for a period of time based on a high bit error rate (BER) of the communication links between the movable object 550 and the affiliated device 502 as reported by the movable object 550, the affiliated device 502 may cause the movable object to enter a smart RTH mode or the movable object may enter the smart RTH mode on its own based on the loss of communication for the period of time, where the movable object automatically returns to the last recorded home point that the unmanned aircraft initiates its flight from. When the anomaly is less severe and the status indicates that the battery level of the movable object 550 is getting low, the affiliated device 502 may cause the movable object to enter a low battery RTH, where the affiliated device 502 may, at the direction of the affiliated device 502, take actions to cause the movable object 550 to save battery or finish a task at hand for a period of time (e.g., 10 seconds), after which the movable object 550 will automatically return to the last recorded home point.

It is to be noted that once the status of the movable object 550 is received at the affiliated device 502, in addition to or in alternative to the affiliated device 502 causing the movable object entering the safety mode, the affiliated device 502 may transmit the status of the movable object 550 to another electronic device. For example, the status of the movable object 550 (anomaly or normal) may be transmitted to a management system (e.g., one that included in a remote controller of the movable object 550), which controls the movable object 550 based on the status.

As illustrated in FIG. 19, the affiliated device 502 obtains the modified value for the at least one of the set of communication parameters and then transmits to the movable object 550, which configures the connection. This approach is only one embodiment for obtaining the modified value. The negotiation of the modified value and configure the connection may be performed in a variety of ways, in accordance with various embodiments of the present invention.

Figure 20A:
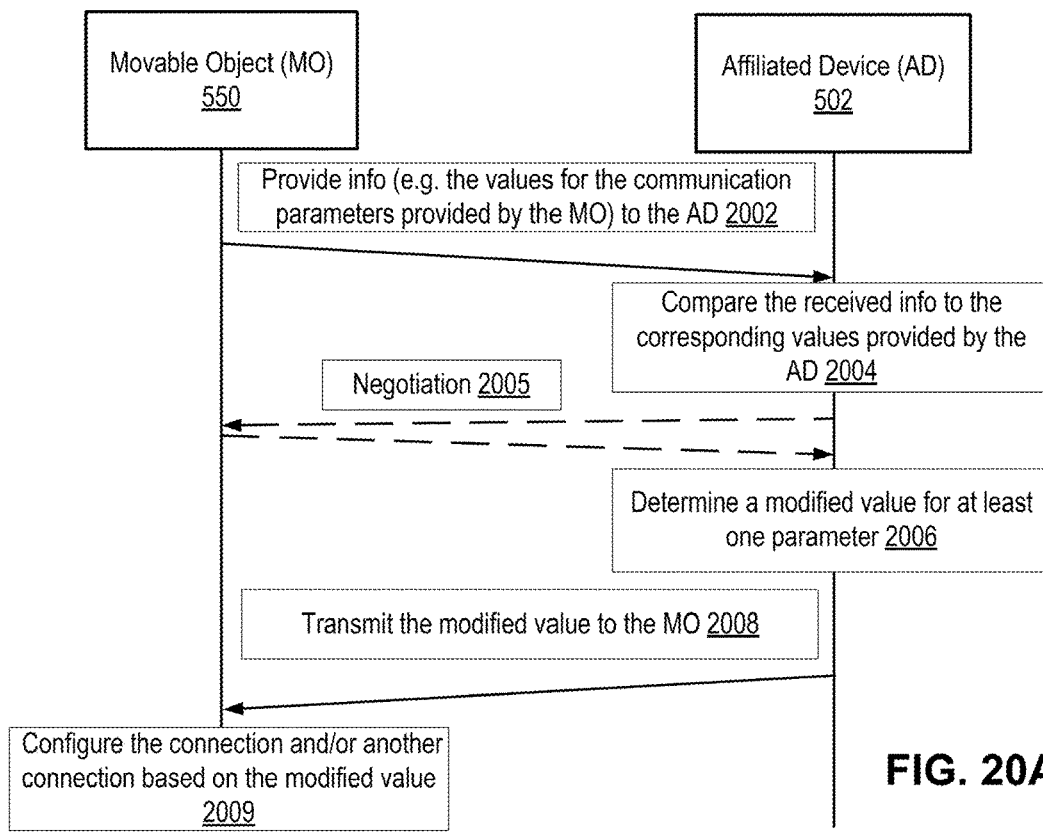
FIG. 20A is an exemplary illustration of communication parameter negotiation between a movable object and an affiliated device and configure a connection according to one embodiment of the invention.

FIG. 20A is an exemplary illustration of communication parameter negotiation between a movable object and an affiliated device and configure a connection according to one embodiment of the invention.

At reference 2002, the affiliated device 502 receives information for a set of communication parameters that are adapted to be used by different affiliated devices to communicate with the movable object 550.

At reference 2004, the affiliated device 502 compares the received information for the set of communication parameters to the corresponding values for the set of communication parameters provided by the affiliated device 502.

At reference 2006, the affiliated device 502 determines a modified value for at least one of the set of the communication parameters. The affiliated device 502 may support a range of values (including the default values) for each of the set of communication parameters, similar to what is discussed in relation to FIG. 22. The ranges of values may be the same for some of the parameters and different for other parameters. The affiliated device 502 determine the modified value from the ranges of values for the set of communication parameters provided by the movable object 550 and the affiliated device 502. The modified value may be one that is supported by both the movable object 550 and the affiliated device 502 and that provides a better connection than the default value (e.g., a bigger bandwidth of the connection, a shorter packet acknowledgment timeout period, a shorter packet retransmission interval, and a bigger size of a packet buffer).

It is to be noted that optionally, the affiliated device 502 and the movable object 550 may perform one or multiple rounds of negotiations before the affiliated device 502 determines the modified value. For example, after receiving the information for the set of communication parameters from the movable object 550, the affiliated device 502 may determine that for one communication parameter, several values (concrete sample points, such as a packet buffer size, in bytes, being 16, 32, and 64) or a narrower range of values (such as a packet buffer size range being 16 to 64) within the range of the values supported by the movable object 550 are preferable. The affiliated device may transmit the several values or the narrower range of values to the movable object 550, which support a wider range of value (such as a packet buffer size range being 5-100). The movable object 550 may examine the now narrowed selection, and determine one value, a few values, or even narrower range of values for the parameter, and send back to the affiliated device 502. The affiliated device 502 may start operations in reference 2006 and determine the modified value. Or the affiliated device 502 may initiate another round of negotiation with the movable object 550. The parameter value negotiation such as the negotiation 2005 makes the modified value more likely to be optimal for both the affiliated device 502 and the movable object 550.

In one embodiment, the modified value may not be for a communication parameter whose information is provided by the movable object. For example, the information provided by the movable object 550 includes a size of its packet buffer (e.g., the supported range of its packet buffer size). The affiliated device 502 may determine that the size of the packet buffer is big enough to support a shorter packet acknowledgment timeout period for the connection (the bigger the packet buffer, the more packets can be buffered for retransmission thus the acknowledgement timeout period can be shorter resulting in a faster retransmission), thus the provided size of packet buffer results in a modified value in the shorter packet acknowledgement timeout period.

Then at reference 2008, the modified value is transmitted to the movable object 550. At reference 2009, the movable object 550 configures the connection between the movable object 550 and the affiliated device 502. In one embodiment, another connection between the movable object 550 and another affiliated device is configured, based on the modified value. For configuring the other connection between the movable object 550 and the other affiliated device, the movable object 550 may determine that the affiliated device 502 is the same type as the other affiliated device thus the other affiliated device supports the modified value too. In this way, a value negotiated between the affiliated device 502 and the movable object 550 may be used for configuring another connection between the movable object 550 and the other affiliated device.

In one embodiment, the configured connection does not use the modified value but uses a different value instead. For example, the configuration of the connection is further based on an operational state of the movable object 550. The operational state of the movable object includes its current workload (e.g., a central processing unit (CPU) usage, and/or available data storage space), battery usage/power consumption, communication link (uplink/downlink) delay, high priority tasks, etc. For example, the movable object 550 may determine that its workload is heavy, and while the received modified value for a connection bandwidth is 20 KB/s from the affiliated device 502, the movable object 550 determines to configure the connection uses a lower connection bandwidth at 15 KB/s, which is still higher than the default 5 KB/s but is more suitable for the operation of movable object 550.

Figure 20B:
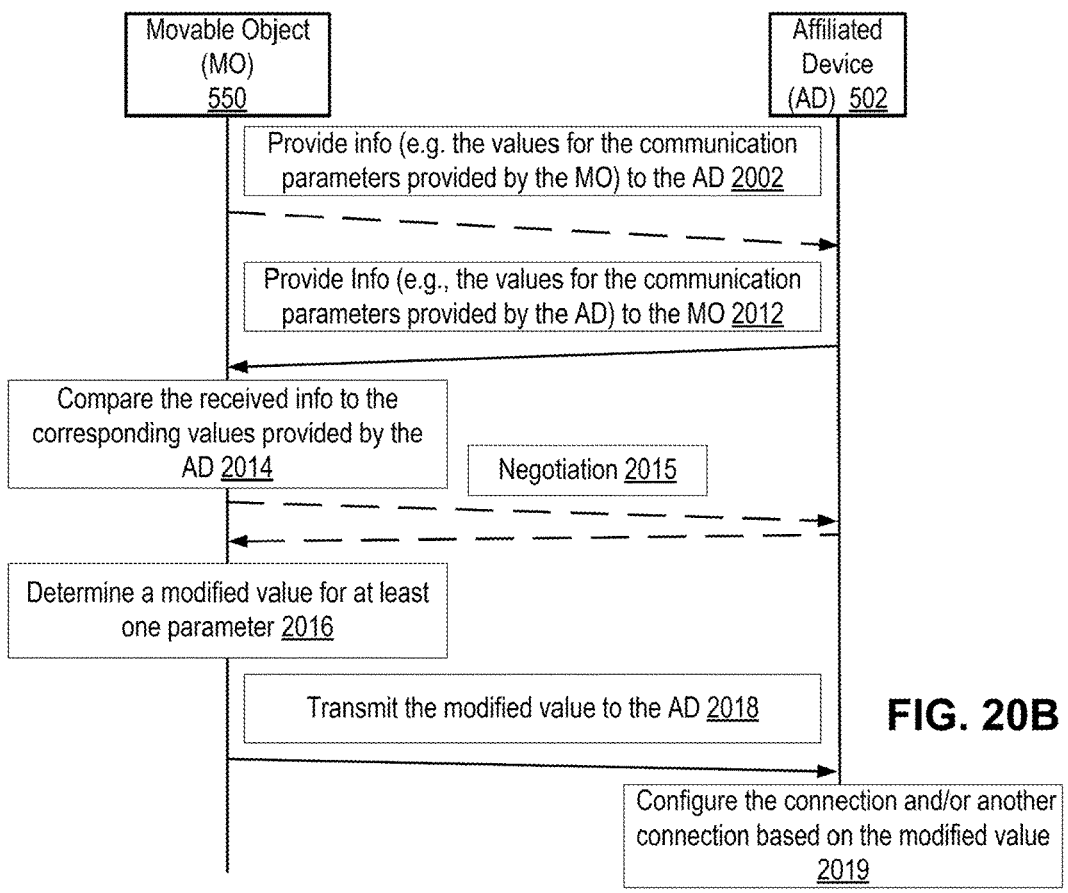
FIG. 20B is another exemplary illustration of communication parameter negotiation between a movable object and an affiliated device and configure a connection according to one embodiment of the invention.

FIG. 20B is another exemplary illustration of communication parameter negotiation between a movable object and an affiliated device and configure a connection according to one embodiment of the invention.

The operations in optional reference 2002 is the same as in illustrated in FIG. 20A, where the affiliated device 502 receives information for a set (referred to as the first set) of communication parameters that are adapted to be used by different affiliated devices to communicate with the movable object 550. However, in FIG. 20B, the affiliated device 502 provides information for a second set of communication parameters that are adapted to be used by the movable object 550 to communicate with the affiliated device 502. The first and second sets of communication parameters may be the same or different. In one embodiment, the affiliated device 502 determines the second set of the communication parameters whose information to be provided based on the first set of communication parameters the affiliated device 502 receives. For example, when the first set of communication parameters includes a packet acknowledgment timeout period, the affiliated device 502 will send information for both the packet acknowledgment timeout period and the size of packet buffer provided by the affiliated device 502 as the two parameters are related (e.g., a short packet acknowledgment timeout period requires a large size of packet buffer). Conversely, the second set of communication parameters may contain less communication parameters than the first set (e.g., because the affiliated device 502 determines that the movable object 550 has the information already).

In one embodiment, without the movable object 550 providing the information for the set of communication parameters first, the affiliated device 2012 provides information for a set of communication parameters to the movable object 550.

At reference 2014, the movable object 550 compares the received information for the set of communication parameters from the affiliated device 502 to the corresponding values for the set of communication parameters provided by the movable object 550. At reference 2016, the movable object 550 determines a modified value for at least one of the set of the communication parameters. The operations in references 2014, 2015, and 2016 are similar to those in references 2004, 2005, and 2006 respectively, except the former are performed by the movable object 550 and the latter are performed by the affiliated device 502. Then at reference 2018, the modified value is transmitted to the affiliated device 502.

At reference 2019, the affiliated device 502 configures the connection between the movable object 550 and the affiliated device 502 based on the modified value. It is to be noted in contrast to FIG. 20A, the affiliated device 502 (instead of the movable object 550) configures the connection. In other words, both an affiliated device and a movable object may configure the connect based on the modified value. Similar to the movable object 550, affiliated device 502 does not use the modified value to configure the connection but uses a different value instead in one embodiment. Instead, the configuration of the connection is further based on an operational state of the affiliated device 502. The operational state of the movable object includes its current workload (e.g., central processing unit (CPU) usage, available data storage space), communication link (uplink/downlink) delay, power consumption, high priority tasks, etc.

It is to be noted that while one modified value is discussed for communication parameter negotiation, multiple modified values may be negotiation through the same process. For example, operations in reference 2006 and 2016 may determine a plurality of modified values for a plurality of communication parameters.

Once the communication parameter negotiation between a movable object and an affiliated device is complete, the next step is to configure the connection between the movable object and the affiliated device based on one or more modified values and use the connection to communicate the movable object's status.

Figure 21:
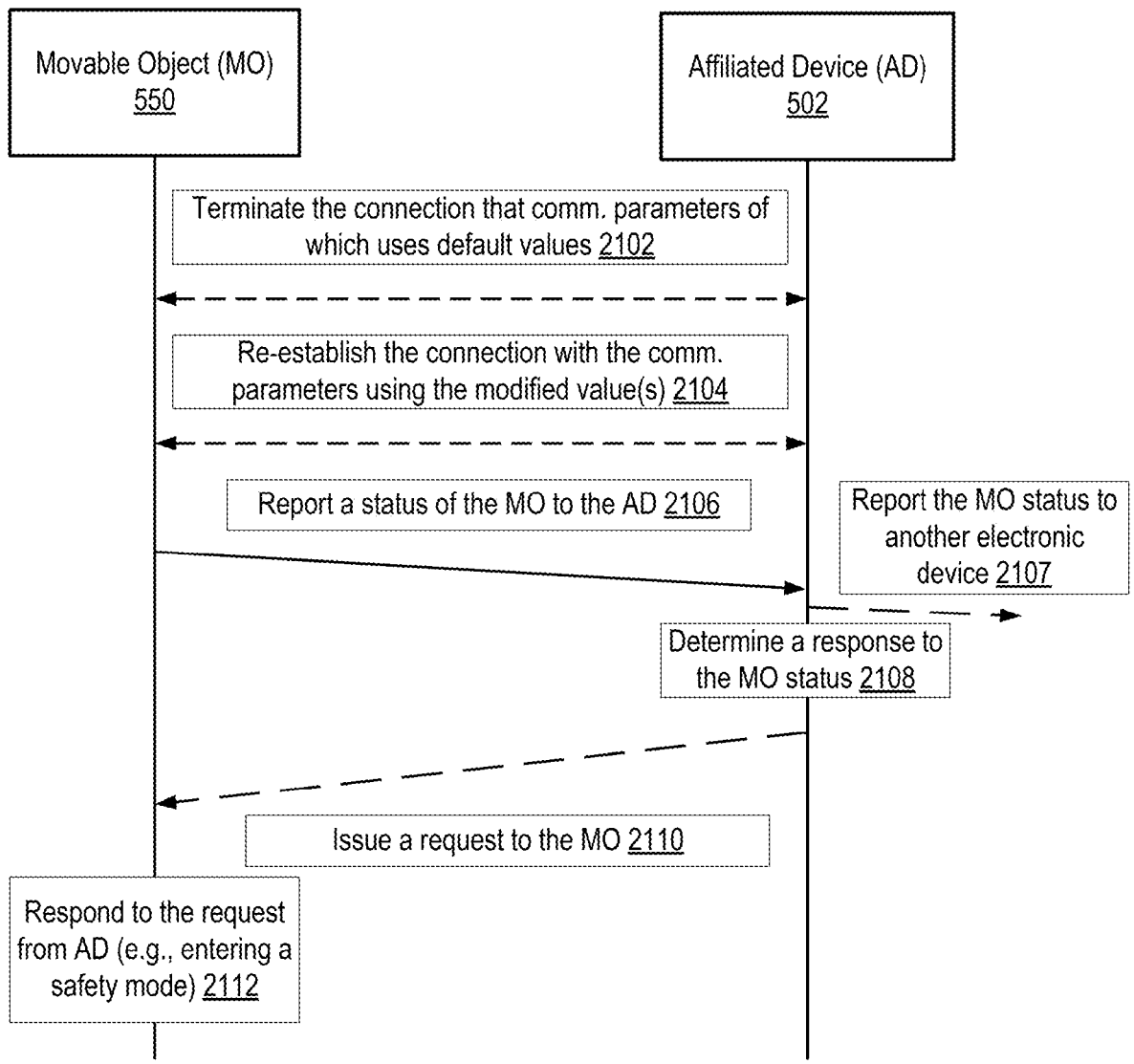
FIG. 21 is an exemplary illustration of configuring and using a connection between a movable object and an affiliated device according to one embodiment of the invention.

FIG. 21 is an exemplary illustration of configuring and using a connection between a movable object and an affiliated device according to one embodiment of the invention. The configuration of the connection occurs after one or more modified values for communication parameters have been obtained.

Optionally at reference 2102, either the movable object 550 or the affiliated device 502 terminates the connection that communication parameters of which uses default values. Then after the termination, either the movable object 550 or the affiliated device 502 reestablishes the connection with the communication parameters using the one or more modified values at reference 2104. In one embodiment, other than the one or more modified values, the rest of the set of communication parameters uses default values. It is to be noted that in an alternative embodiment, the configuration of the connection does not involve termination and re-establishing the connection, rather, the configuration is to update one or more the communication parameters of the connection.

Then at reference 2106, the movable object 550 reports a status of the movable object to the affiliated device 502 (e.g., high BER and/or low battery low as discussed herein above). Upon receiving the status of the movable object, the affiliated device 502 may report the movable object status to another electronic device at reference 2017. For example, the movable object status may be reported to a handheld electronic device or a wearable electronic device such as a remote controller of the movable object 550, and the other electronic device may examine the movable object status and determine the proper response based on the status. Additionally or alternatively at reference 2108, the affiliated device 502 itself may determine a response to the movable object status. Then at reference 2110, the affiliated device issues a request to the movable object 550 based on the determination. Once the movable object 550 receives the request, the movable object 550 responds to the request from the affiliated device 502 (e.g., entering into a safety mode) at reference 2112.

Figure 23:
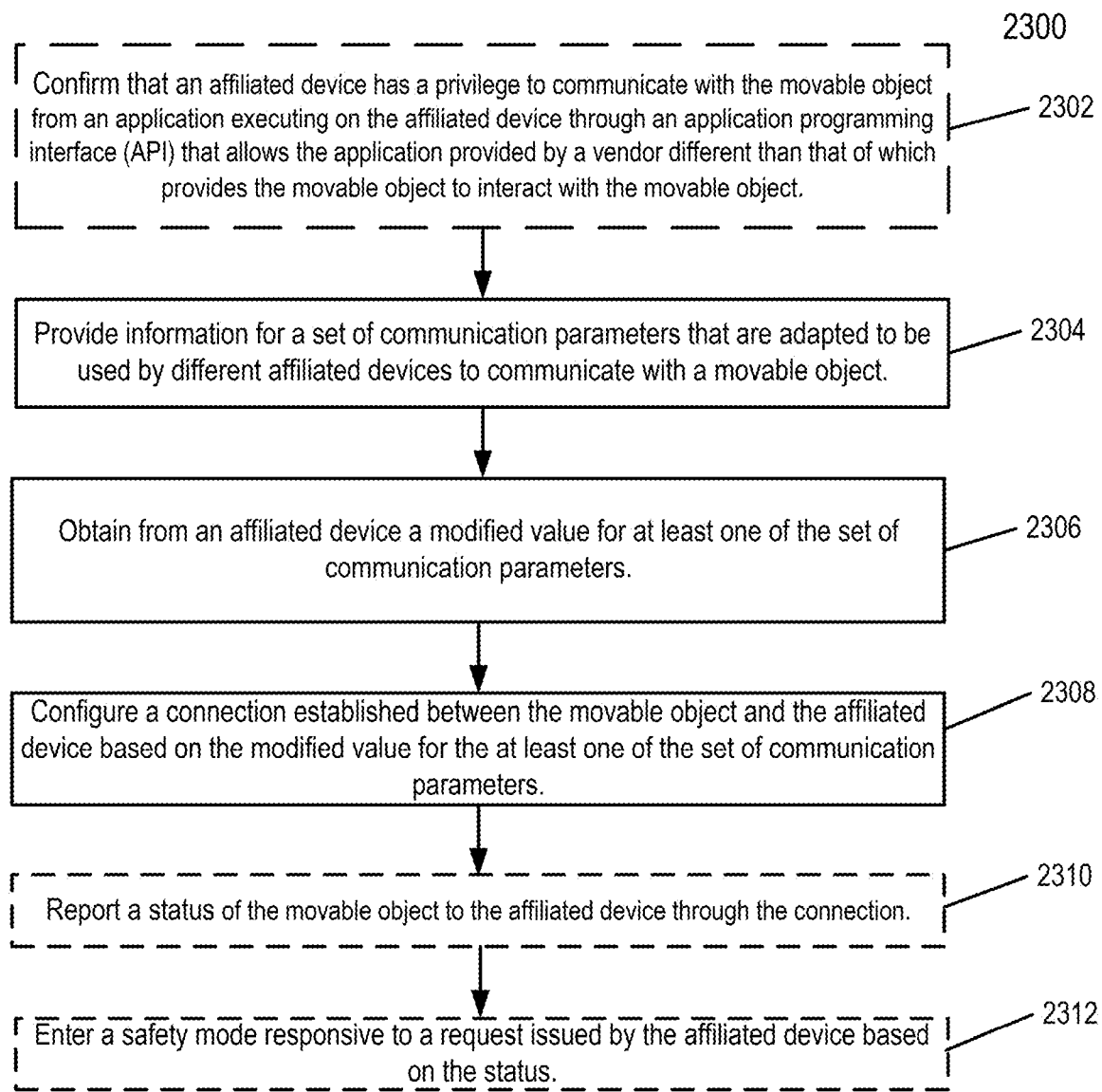
FIG. 23 is a flow diagram illustrating the operations of a movable object for automatic update of a connection to the movable object in movable object environment, in accordance with various embodiments of the present invention.

FIG. 23 is a flow diagram illustrating the operations of a movable object for automatic update of a connection to the movable object in movable object environment, in accordance with various embodiments of the present invention. Method 2300 may be performed by a movable object controller (e.g., the movable object controller 621 or 821 in FIGS. 6-8) of a movable object.

Optionally at reference 2302, it is confirmed that an affiliated device has a privilege to communicate with the movable object from an application executing on the affiliated device through an application programming interface (API) that allows the application provided by a vendor different than that of which provides the movable object to interact with the movable object. In one embodiment, the confirmation includes checking a registration of the affiliated device. In one embodiment, the registration of the affiliated device is checked through an authentication server of the movable object in one embodiment.

At reference 2304, information for a set of communication parameters that are adapted to be used by different affiliated devices to communicate with a movable object is provided. At reference 2306, a modified value for at least one of the set of communication parameters is obtained. Then at reference 2308, a connection established between the movable object and the affiliated device is configured based on the modified value for the at least one of the set of communication parameters.

Optionally at reference 2310, a status of the movable object is reported to the affiliated device through the connection. The status indicates an anomaly in one embodiment, and at reference 2312, the movable object enters a safety mode responsive to a request issued by the affiliated device based on the status.

Figure 24:
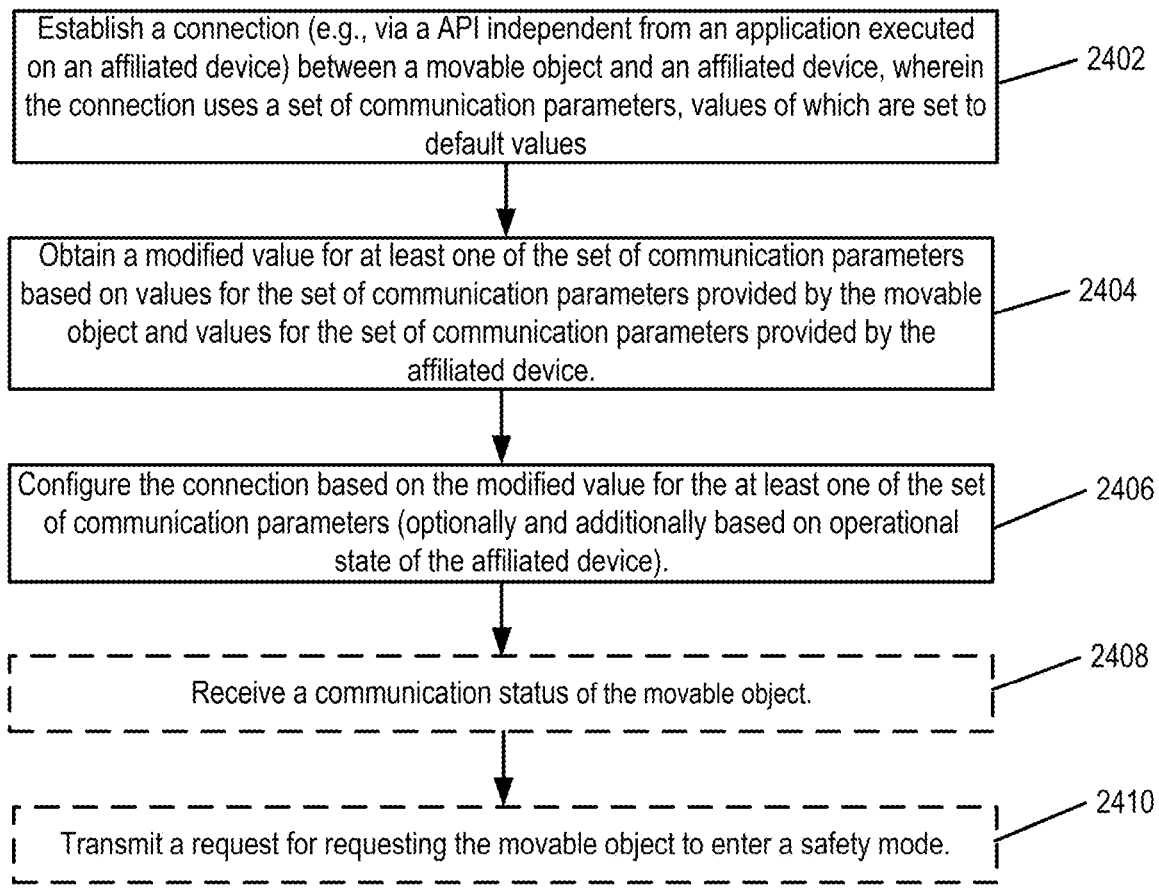
FIG. 24 is a flow diagram illustrating the operations of an affiliated device for automatic update of a connection to the movable object in movable object environment, in accordance with various embodiments of the present invention.

FIG. 24 is a flow diagram illustrating the operations of an affiliated device for automatic update of a connection to the movable object in movable object environment, in accordance with various embodiments of the present invention. Method 2400 may be performed by an application of the affiliated device.

At reference 2402, a connection is established between a movable object and an affiliated device, where the connection uses a set of communication parameters, values of which are set to default values. In one embodiment, the connection is established from an application executing on the affiliated device through an API that allows the application provided by a vendor different than that of which provides the movable object to interact with the movable object.

At reference 2404, a modified value for at least one of the set of communication parameters is obtained, based on values for the set of communication parameters provided by the movable object and values for the set of communication parameters provided by the affiliated device.

At reference 2406, the connection is configured based on the modified value for the at least one of the set of communication parameters. In one embodiment, the connection is configured additionally based on an operational state of the affiliated device, and the connection is configured using a value different from the modified value for the at least one of the set of communication parameters.

Through embodiments of the various embodiments of the present invention, a movable object and an affiliated device may automatically update a connection established between the movable object and the affiliated device. The negotiation of a set of communication parameters for the connection allows optimization of the connection based on the communication parameters provided by the movable object and the affiliated device, and the movable object may report it statuses to the affiliated device, which may control the movable object accordingly.

Figure 25:
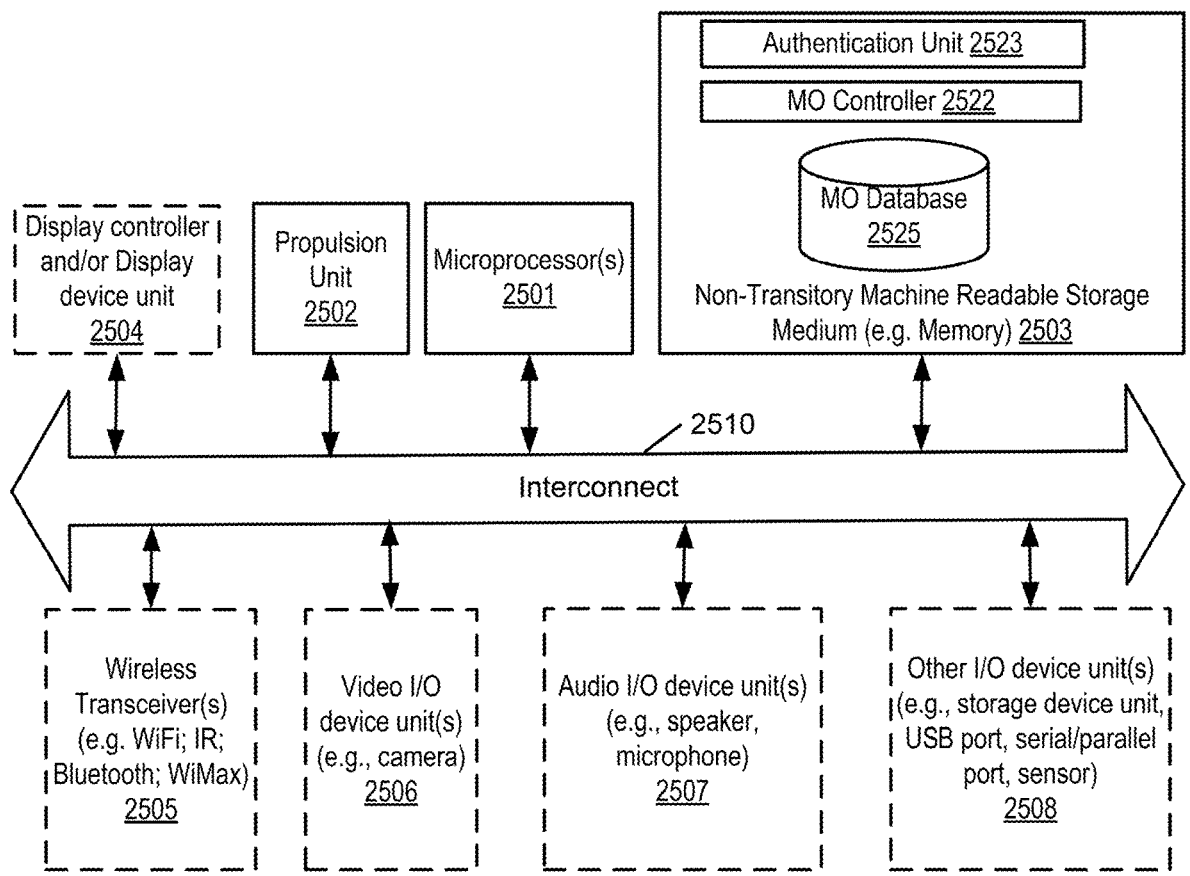
FIG. 25 is an exemplary illustration of a movable object, in accordance with various embodiments of the present invention.

FIG. 25 is an exemplary illustration of a movable object, in accordance with various embodiments of the present invention. The movable object 2500 is an electronic device including many different components. These components can be implemented as integrated circuits (ICs), portions thereof, discrete electronic devices, or other modules adapted to a circuit board such as a motherboard or add-in card of a computing system, or as components otherwise incorporated within a chassis of the computing system. Note also that the movable object 2500 is intended to show a high level view of many components of the computing system. However, it is to be understood that additional components may be present in certain implementations and furthermore, different arrangement of the components shown may occur in other implementations.

In one embodiment, the movable object 2500 includes one or more microprocessors 2501, propulsion unit 2502, and non-transitory machine-readable storage medium 2503, and optional devices 2504-2508 that are interconnected via a bus or an interconnect 2510. The one or more microprocessor 2501 represent one or more general-purpose microprocessors such as a central processing unit (CPU), or processing device. More particularly, the microprocessor 2501 may be a complex instruction set computing (CISC) microprocessor, reduced instruction set computing (RISC) microprocessor, very long instruction word (VLIW) microprocessor, or microprocessor implementing other instruction sets, or microprocessors implementing a combination of instruction sets. Microprocessor 2501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

The one or more microprocessor 2501 may communicate with non-transitory machine-readable storage medium 2503 (also called computer-readable storage medium), such as magnetic disks, optical disks, read only memory (ROM), flash memory devices, and phase change memory. The non-transitory machine-readable storage medium 2503 may store information including sequences of instructions, such as computer programs, that are executed by the one or more microprocessors 2501, or any other device units. For example, executable code and/or data of a variety of operating systems, device drivers, firmware (e.g., input output basic system or BIOS), and/or applications can be loaded in the one or more microprocessor 2601 and executed by the one or more microprocessor 2601.

The non-transitory machine-readable storage medium 2503 may store an authentication unit 2523, a movable object controller 2522, and a movable object database 2525, each of which contain instructions and/or information to perform operations discussed herein above with regard to the corresponding authentication units (e.g., authentication units 423 or 623), movable object controller (e.g., movable object controller 621 or 821), and movable object database (e.g., movable object database 625). The movable object controller 2522, along with the authentication unit 2523 and the movable object database 2525 may operate to perform operations discussed herein above in methods 900, 1000, 1300, 1600, 1700, and 2300 in accordance with various embodiments of the present invention. The non-transitory machine-readable storage medium 2503 may also store computer program code, executable by the one or more microprocessor 2501, to perform operations discussed herein above in methods 900, 1000, 1300, 1600, 1700, and 2300 in accordance with various embodiments of the present invention.

The propulsion unit 2502 may include one or more devices or systems operable to generate forces for sustaining controlled movement of the movable object 2500. The propulsion unit 2502 may share or may each separately include or be operatively connected to a power source, such as a motor (e.g., an electric motor, hydraulic motor, pneumatic motor, etc.), an engine (e.g., an internal combustion engine, a turbine engine, etc.), a battery bank, etc., or combinations thereof. The propulsion unit 2502 may also include one or more rotary components connected to the power source and configured to participate in the generation of forces for sustaining controlled flight. For instance, rotary components may include rotors, propellers, blades, nozzles, etc., which may be driven on or by a shaft, axle, wheel, hydraulic system, pneumatic system, or other component or system configured to transfer power from the power source. The propulsion unit 2502 and/or rotary components may be adjustable with respect to each other and/or with respect to movable object 2500. The propulsion unit 2502 may be configured to propel movable object 2500 in one or more vertical and horizontal directions and to allow movable object 2500 to rotate about one or more axes. That is, the propulsion unit 2502 may be configured to provide lift and/or thrust for creating and maintaining translational and rotational movements of movable object 2500.

The movable object 2500 may optionally further include display control and/or display device unit 2504, wireless transceiver(s) 2505, video I/O device unit(s) 2506, audio I/O device unit(s) 2507, and other I/O device units 2508 as illustrated. The wireless transceiver 2505 may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof.

The video I/O device unit 2506 may include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips and conferencing. The video I/O device unit 2506 may be a 4K camera/camcorder in one embodiment.

An audio I/O device unit 2507 may include a speaker and/or a microphone to facilitate voice-enabled functions, such as voice recognition, voice replication, digital recording, and/or telephony functions. Other optional devices 2508 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. The optional device units 2508 may further include certain sensors coupled to the interconnect 2510 via a sensor hub (not shown), while other devices such as a thermal sensor, an altitude sensor, an accelerometer, and an ambient light sensor may be controlled by an embedded controller (not shown), dependent upon the specific configuration or design of the movable object 2500.

Figure 26:
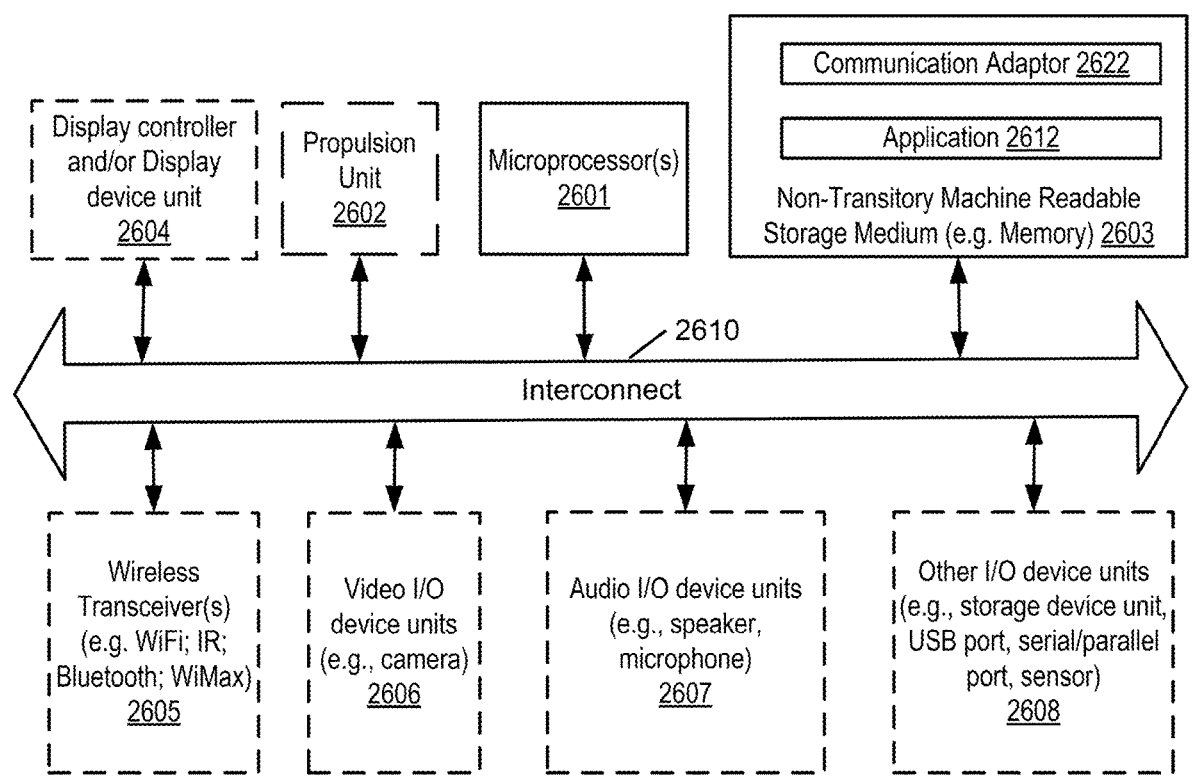
FIG. 26 is an exemplary illustration of an affiliated device, in accordance with various embodiments of the present invention.

FIG. 26 is an exemplary illustration of an affiliated device, in accordance with various embodiments of the present invention. As illustrated in FIG. 26, an affiliated device 2600 is similar to the movable object 2500, and differences between the two are discussed herein. The propulsion unit 2602 is an optional module in the affiliated device 2600, which may be implemented when the affiliated device 2600 is another movable object.

The non-transitory machine-readable storage medium 2603 may store a communication adaptor 2622 and an application 2612, each of which contain instructions and/or information to perform operations discussed herein above with regard to the corresponding communication adaptor (e.g., communication adaptors 532, 732-734, or 832-836), and application (e.g., application 112, 204, 304, 314, 404, or 512-516). The communication adaptor 2622 and application 2612 may operate to perform operations discussed herein above in methods 1800 and 2400 in accordance with various embodiments of the present invention. The non-transitory machine-readable storage medium 2603 may also store computer program code, executable by the one or more microprocessor 2601, to perform operations discussed herein above in methods 1800 and 2400 in accordance with various embodiments of the present invention.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. A method for supporting data distribution in a movable object environment, comprising:
   receiving a request for characteristic data of a movable object from a requester of an affiliated device;
   confirming that the characteristic data is available on the movable object and that the requester has a privilege to access the characteristic data, wherein confirming that the characteristic data is available on the movable object comprises:
      determining that a version of the characteristic data in a database of the moving object matches a version for the characteristic data requested based on a cryptographic key match between the versions; and
   providing the characteristic data to the affiliated device responsive to the confirmation, comprising:
      determining a workload of at least one of the movable object and the affiliated device;
      determining time sensitivity of the characteristic data; and
      delaying a period of time based on at least one of the workload and the time sensitivity prior to transmitting the characteristic data to the affiliated device.

2. The method of claim 1, wherein the movable object is an unmanned aircraft, an unmanned vehicle, or a robot.

3. The method of claim 1, wherein the characteristic data is stored in a database of the movable object.

4. The method of claim 3, wherein a controller on the movable object operates to write the characteristic data into the database in real-time or near real-time.

5. The method of claim 1, wherein the characteristic data includes the movable object's velocity, position, altitude, and/or period of time in motion in real-time or near real-time.

6. The method of claim 1, further comprising:
   receiving one other request for one other characteristic data of the movable object from the requester or one other requester of the affiliated device;
   confirming that the other characteristic data is available on the movable object and that the requester or the other requester has a privilege to access the other characteristic data; and
   providing the other characteristic data instead of the characteristic data.

7. The method of claim 1, further comprising:
   receiving an update of the privilege of the requester; and
   providing other characteristic data or providing less of the characteristic data based on the updated privilege.

8. The method of claim 1, wherein the requester is an application executing on the affiliated device, wherein the application initiates the request for characteristic data through an application programming interface (API).

9. The method of claim 1, wherein the confirming that the requester has the privilege to access the characteristic data comprises: checking a registration of the requester.

10. The method of claim 1, wherein the confirming that the characteristic data is available comprises:
    determining a data identifier of the characteristic data from the request for the characteristic data; and
    using the data identifier to identify the characteristic data in the database of the movable object.

11. The method of claim 10, wherein the data identifier is one or more of a field name of the characteristic data, a hash of the field name, and a sequential order of a field for the characteristic data.

12. The method of claim 10, wherein the confirming that the characteristic data is available further comprises:
    determining that a version of the database matches a version of the characteristic data requested.

13. The method of claim 1, further comprising:
    receiving an indication of whether the characteristic data provided to the affiliated device satisfies a timing requirement of the affiliated device; and
    adjusting the period of time for a subsequent transmission of the characteristic data to the affiliated device based on the indication.

14. The method of claim 1, wherein the characteristic data is provided periodically based on a characteristic data distribution interval specified in the request.

15. The method of claim 14, further comprising:
    receiving an update of the characteristic data distribution interval; and
    providing the characteristics data to the affiliated device periodically based on the update of the characteristic data distribution interval.

16. A system for supporting data distribution in a movable object environment, comprising:
    one or more hardware microprocessors; and
    a controller, running on the one or more hardware microprocessors, wherein the controller operates to:

receive a request for characteristic data of a movable object from a requester of an affiliated device, confirm that the characteristic data is available on the movable object and that the requester has a privilege to access the characteristic data, wherein confirming that the characteristic data is available on the movable object comprises:

determining that a version of the characteristic data in a database of the moving object matches a version for the characteristic data requested based on a cryptographic key match between the versions, and provide the characteristic data to the affiliated device responsive to the confirmation, comprising:

determining a workload of at least one of the movable object and the affiliated device;

determining time sensitivity of the characteristic data; and delaying a period of time based on at least one of the workload and the time sensitivity prior to transmitting the characteristic data to the affiliated device.

17. A non-transitory computer-readable storage medium with instructions stored thereon, that when executed by a processor, perform operations for supporting data distribution in a movable object environment, the operations comprising:

receiving a request for characteristic data of a movable object from a requester of an affiliated device;

confirming that the characteristic data is available on the movable object and that the requester has a privilege to access the characteristic data, wherein confirming that the characteristic data is available on the movable object comprises:

determining that a version of the characteristic data in a database of the moving object matches a version for the characteristic data requested based on a cryptographic key match between the versions; and providing the characteristic data to the affiliated device responsive to the confirmation, comprising:

determining a workload of at least one of the movable object and the affiliated device;

determining time sensitivity of the characteristic data; and delaying a period of time based on at least one of the workload and the time sensitivity prior to transmitting the characteristic data to the affiliated device.

* * * * *